July 24, 1962  H. R. SHAMPAINE ET AL  3,046,071
HEAD-END CONTROL SURGICAL OPERATING TABLE
Filed July 24, 1958  12 Sheets-Sheet 1
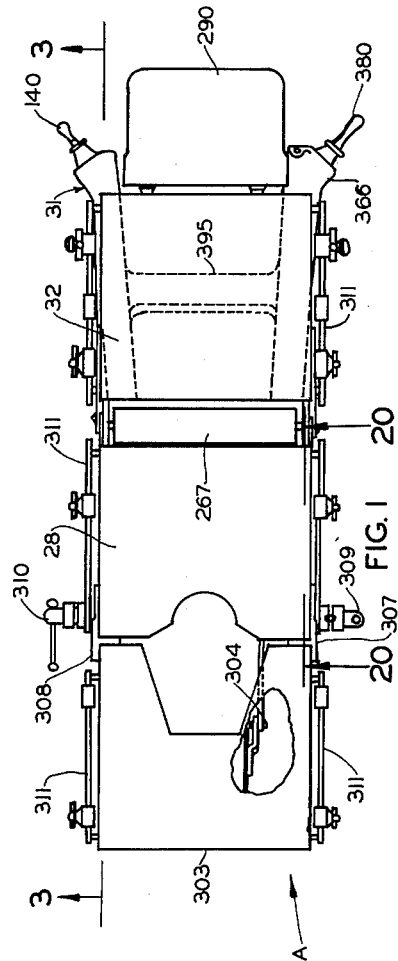
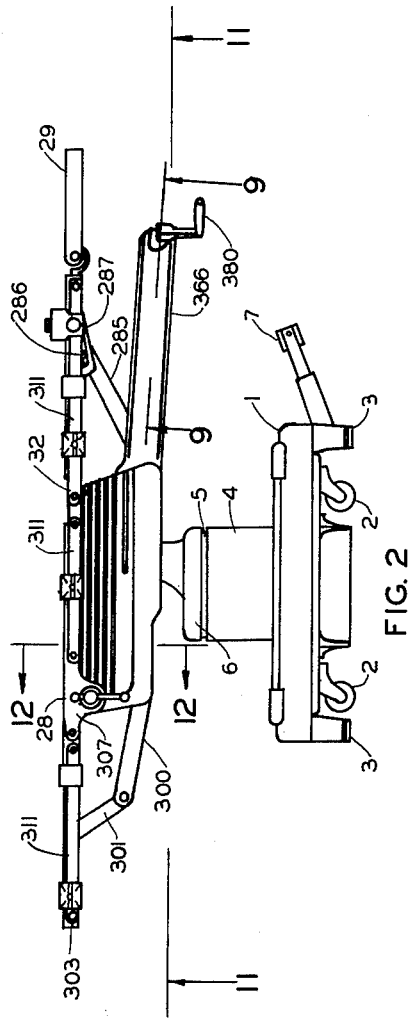
INVENTORS.
HYMAN ROBERT SHAMPAINE
ROY T. ADOLPHSON
&
JOHN DOUGLASS, JR.
BY
ATT'Y.

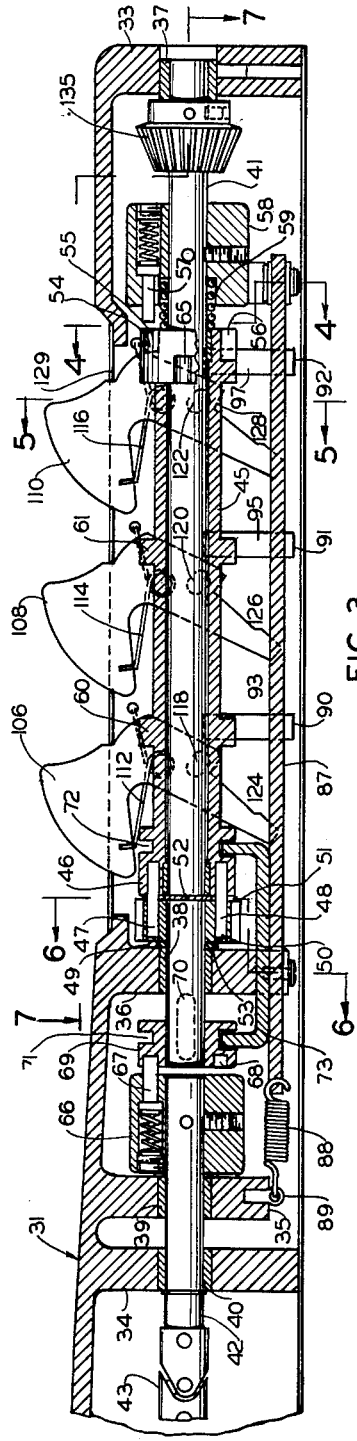

July 24, 1962 H. R. SHAMPAINE ETAL 3,046,071
HEAD-END CONTROL SURGICAL OPERATING TABLE
Filed July 24, 1958 12 Sheets-Sheet 3

INVENTORS.
HYMAN ROBERT SHAMPAINE
ROY T. ADOLPHSON
& JOHN DOUGLASS, JR.
BY
ATT'Y.

July 24, 1962 H. R. SHAMPAINE ETAL 3,046,071
HEAD-END CONTROL SURGICAL OPERATING TABLE
Filed July 24, 1958 12 Sheets-Sheet 4
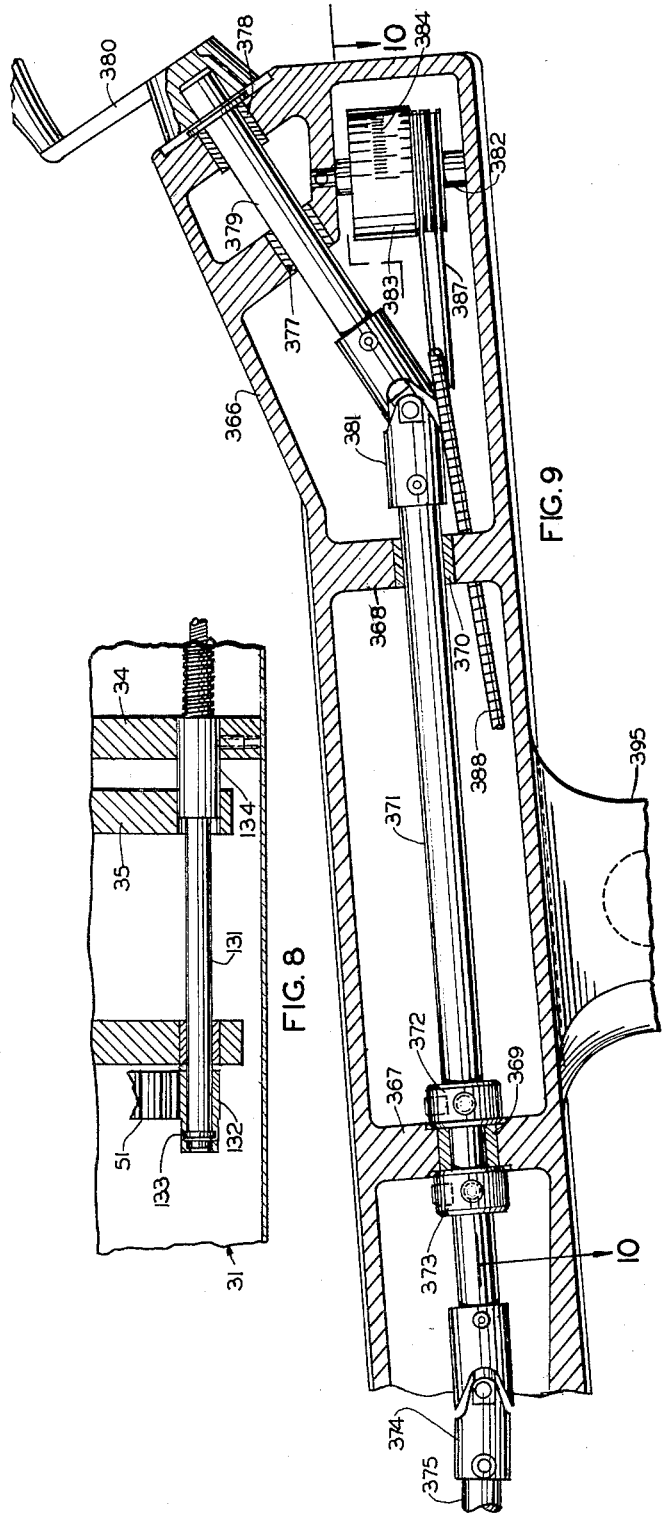
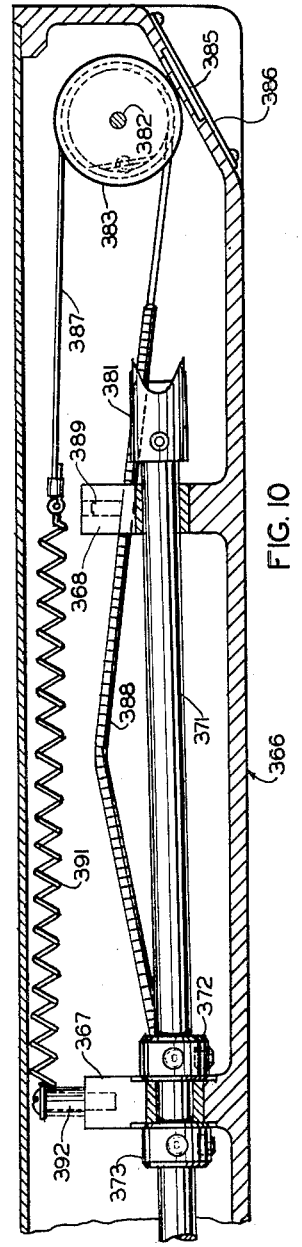
INVENTORS.
HYMAN ROBERT SHAMPAINE
ROY T. ADOLPHSON
& JOHN DOUGLASS, JR.
BY
ATT'Y.

July 24, 1962 H. R. SHAMPAINE ETAL 3,046,071
HEAD-END CONTROL SURGICAL OPERATING TABLE
Filed July 24, 1958 12 Sheets-Sheet 5

INVENTORS.
HYMAN ROBERT SHAMPAINE
ROY T. ADOLPHSON
& JOHN DOUGLASS, JR.
BY
*alfred w Petchaft*
ATT'Y.

July 24, 1962 H. R. SHAMPAINE ETAL 3,046,071
HEAD-END CONTROL SURGICAL OPERATING TABLE
Filed July 24, 1958 12 Sheets-Sheet 6

INVENTORS.
HYMAN ROBERT SHAMPAINE
ROY T. ADOLPHSON
& JOHN DOUGLASS, JR.
BY
ATT'Y.

July 24, 1962 H. R. SHAMPAINE ETAL 3,046,071
HEAD-END CONTROL SURGICAL OPERATING TABLE
Filed July 24, 1958 12 Sheets-Sheet 8

INVENTORS.
HYMAN ROBERT SHAMPAINE
ROY T. ADOLPHSON
&
BY JOHN DOUGLASS, JR.

ATT'Y.

INVENTORS.
HYMAN ROBERT SHAMPAINE
ROY T. ADOLPHSON
&
JOHN DOUGLASS, JR.
BY

ATT'Y.

July 24, 1962 H. R. SHAMPAINE ETAL 3,046,071
HEAD-END CONTROL SURGICAL OPERATING TABLE
Filed July 24, 1958 12 Sheets-Sheet 10

INVENTORS.
HYMAN ROBERT SHAMPAINE
ROY T. ADOLPHSON
& JOHN DOUGLASS, JR.
BY
ATT'Y.

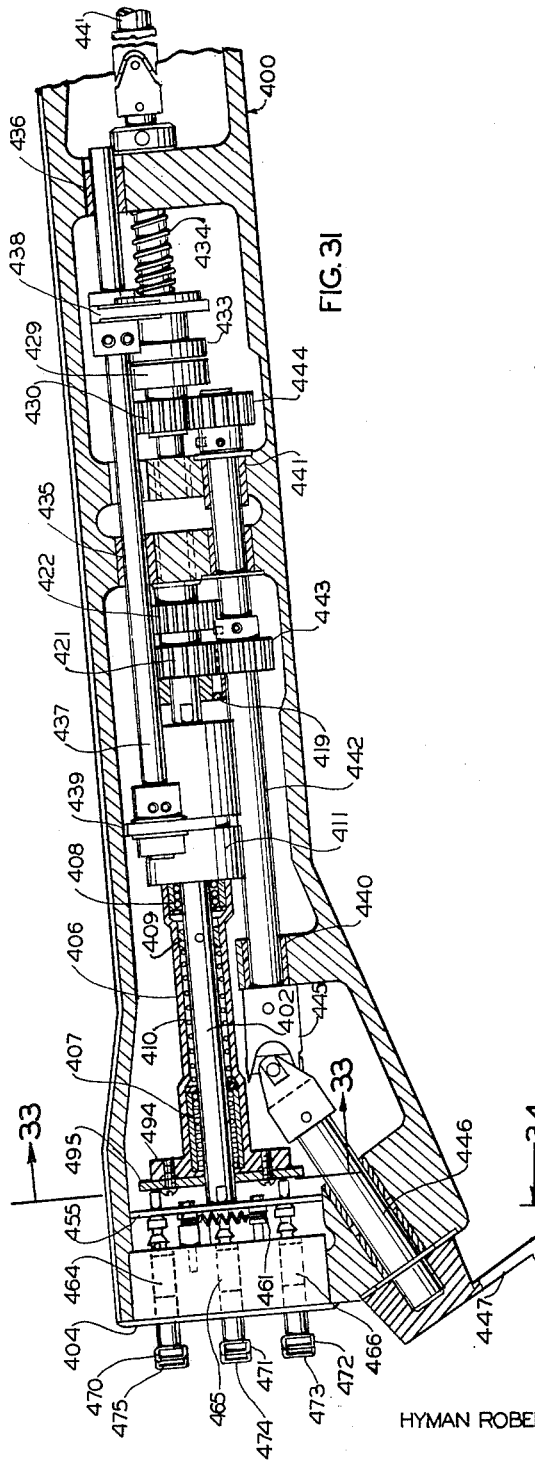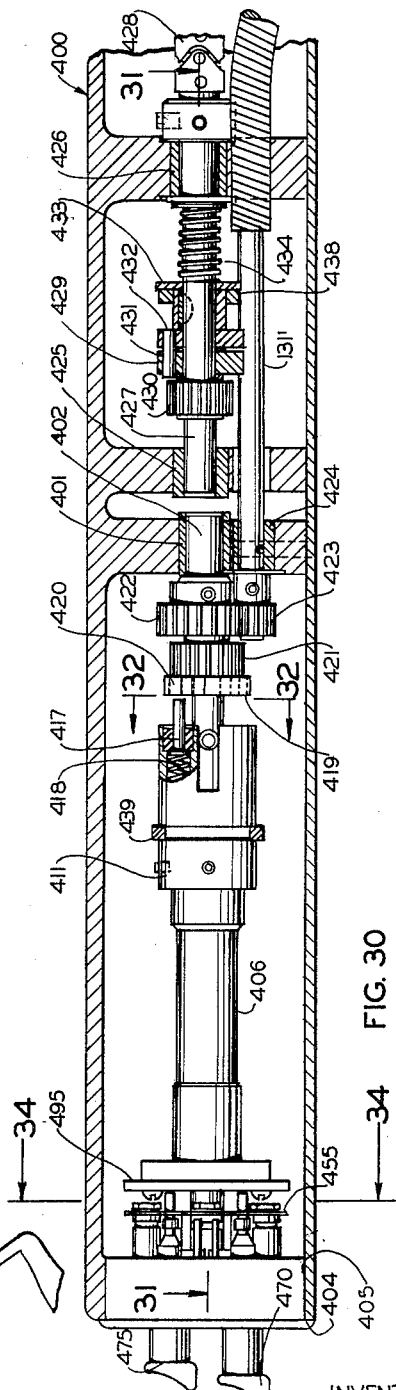

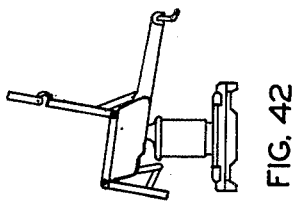
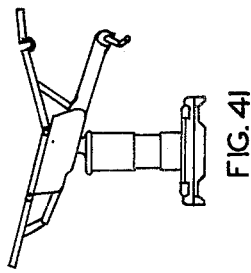
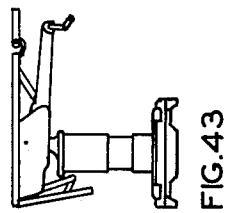
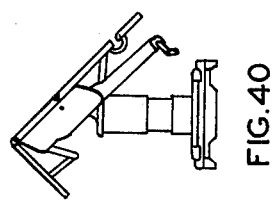
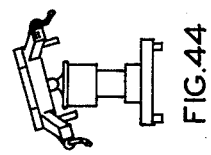
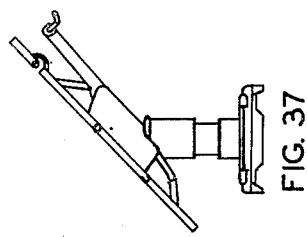
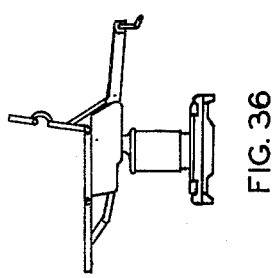
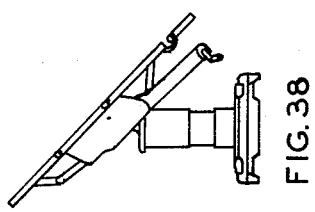
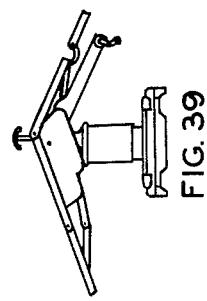

United States Patent Office 3,046,071
Patented July 24, 1962

3,046,071
HEAD-END CONTROL SURGICAL
OPERATING TABLE
Hyman Robert Shampaine, 00 Dromara Road, Ladue 24,
Mo., Roy T. Adolphson, Webster Groves, and John
Douglass, Jr., St. Louis, Mo.; said Adolphson and said
Douglass assignors to said Shampaine
Filed July 24, 1958, Ser. No. 750,711
22 Claims. (Cl. 311—7)

This invention relates in general to surgical apparatus, and, more particularly, to certain new and useful improvements in operating tables of the type ordinarily used in performing major surgery.

It is the primary object of the present invention to provide an operating table having an articulated top which, as a unit, may be laterally and longitudinally tilted and may be adjusted so that various sections of the top may assume a variety of positions required by different surgical operations.

It is also an object of the present invention to provide an operating table of the type stated in which the top-section adjusting controls are located near the head of the table and are accessible to the anesthetist or other person manipulating the operating table from the seated position.

It is a further object of the present invention to provide an operating table of the type stated in which the top-sections are controlled by a push-button type selector panel and two operating handles, all of which are located on a pair of control arms and outside of the sterile field.

It is another object of the present invention to provide an operating table of the type stated which is capable of assuming a materially greater complementary flex angle than has heretofore been obtainable.

It is an additional object of the present invention to provide an operating table of the type stated which eliminates the need for a separate operating handle for the kidney or body elevator and also allows a single handle control for adjustment of the proctoscopic position.

It is another object of the present invention to provide an operating table of the type stated in which the body elevator will always substantially bisect the angle between the seat and back-sections of the table irrespective of their relative positions.

It is still another object of the present invention to provide an operating table of the type stated which permits movement of the table to and from Trendelenberg and reverse Trendelenberg position without disturbing any pre-set relative position of the table top-sections.

With the above and other objects in view, our invention resides in the novel features of form, construction, arrangement, and combination of parts presently described and pointed out in the claims.

In the accompanying drawings (twelve sheets)—

FIG. 1 is a top plan view of an operating table constructed in accordance with and embodying the present invention;

FIG. 2 is a side elevational view thereof;

FIG. 3 is a fragmentary sectional view taken along line 3—3 of FIG. 1;

Figure 11:
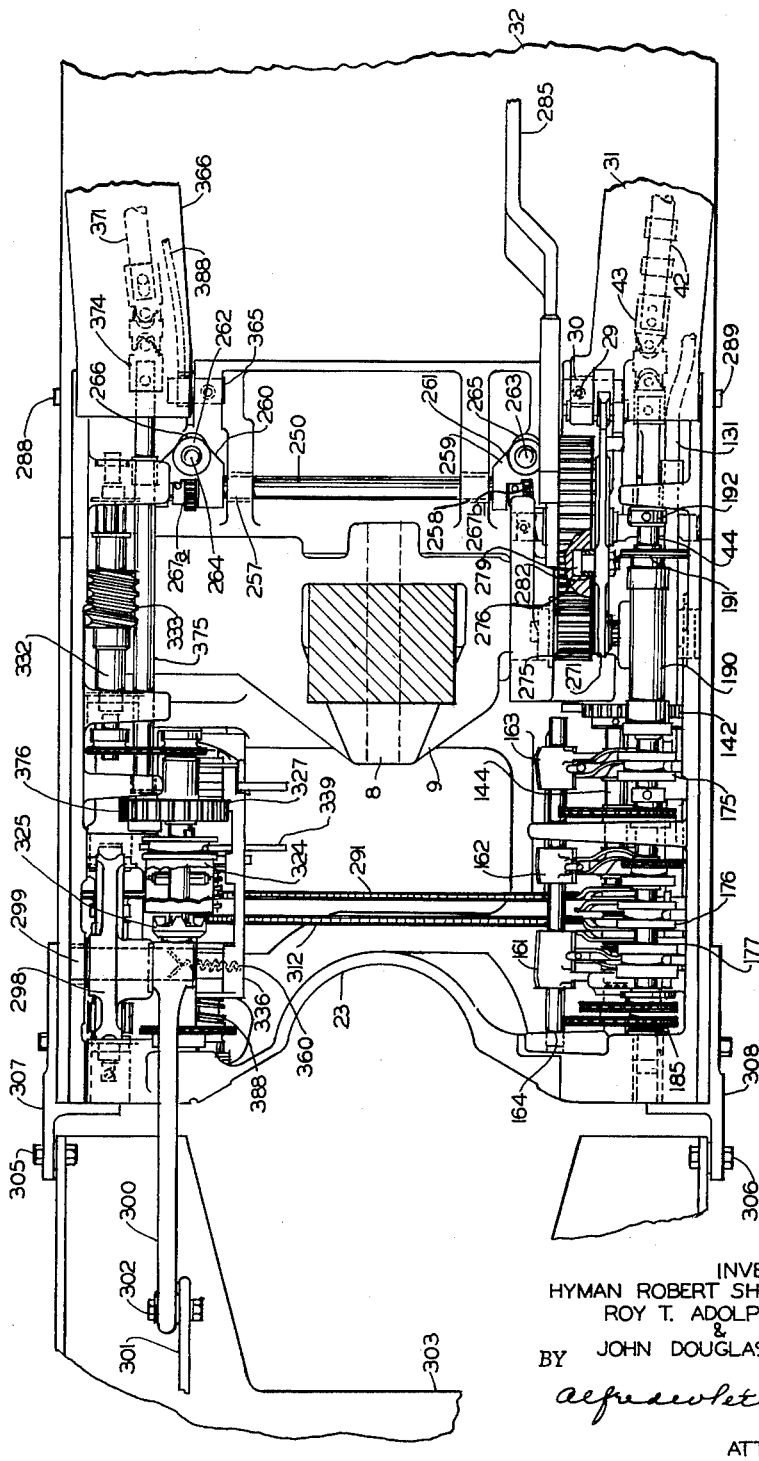
Figure 12:
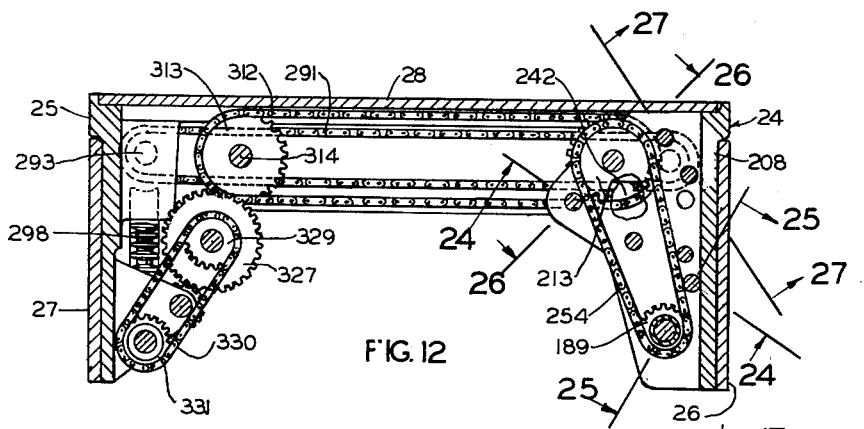
Figure 13:
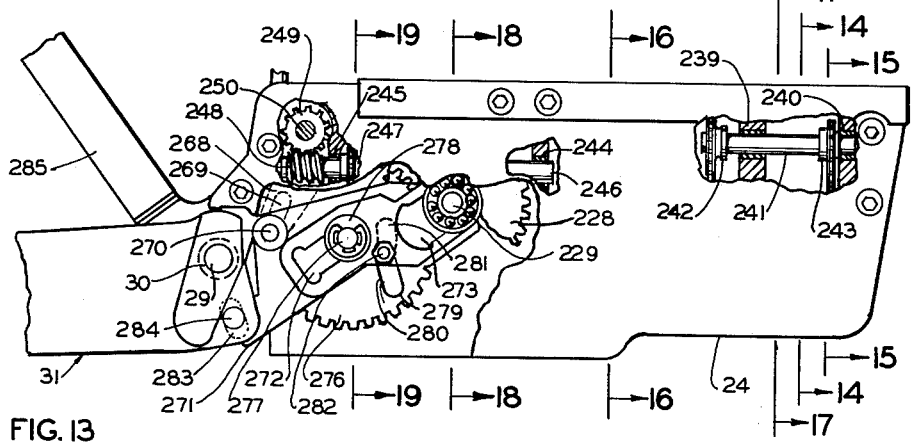
Figure 23:
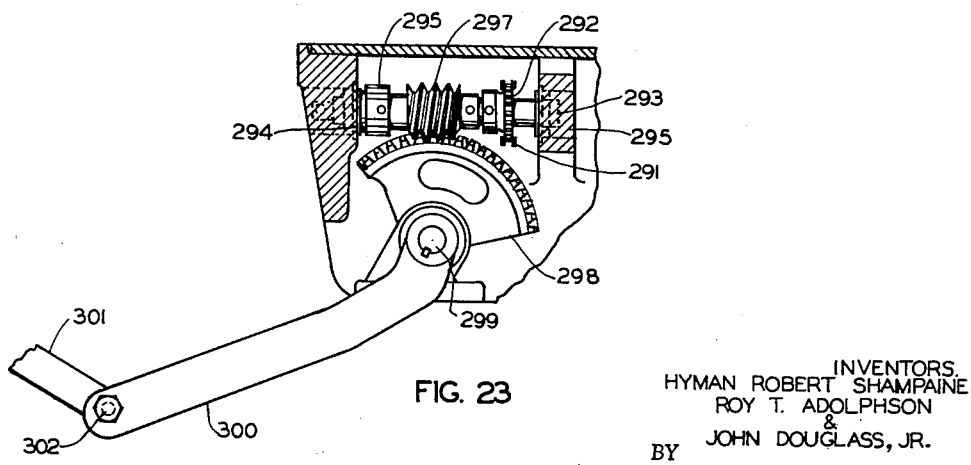
Figure 14:
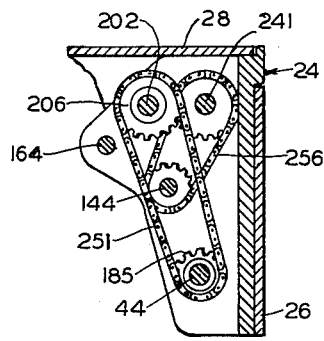
Figure 15:
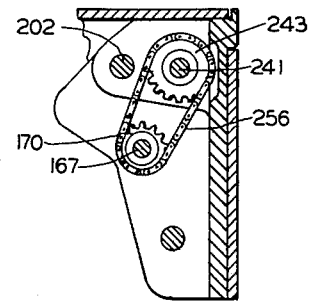
Figure 16:
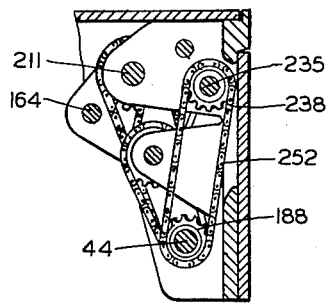
Figure 17:
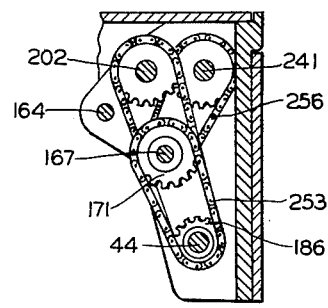
Figure 18:
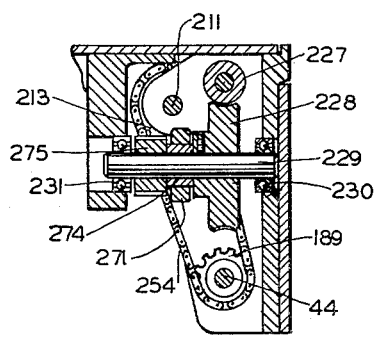
Figure 19:
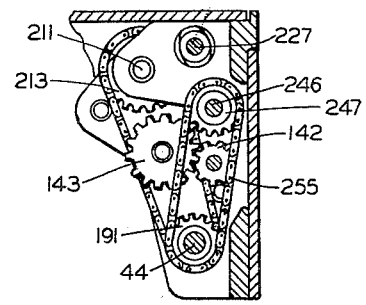
Figure 20:
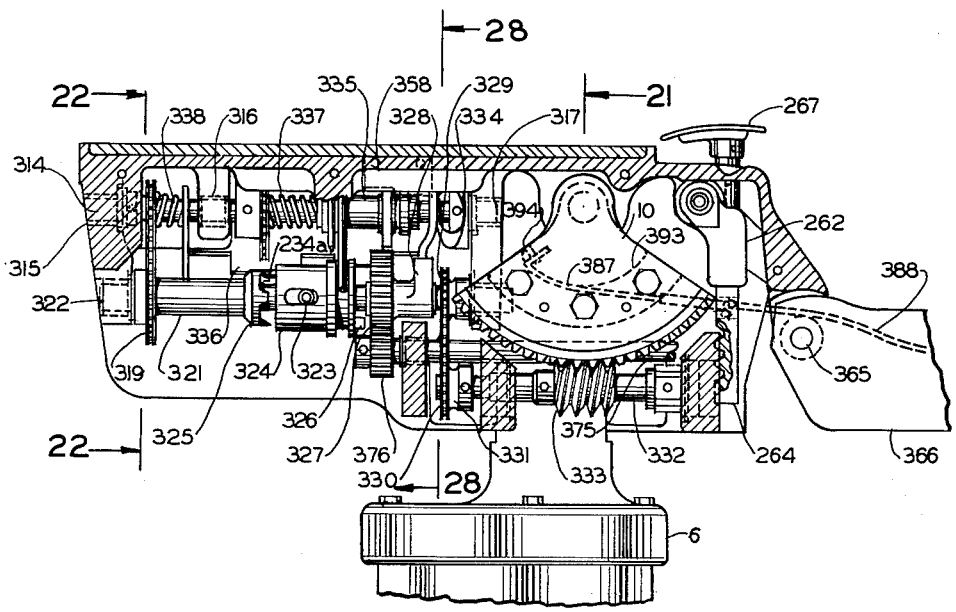
Figure 21:
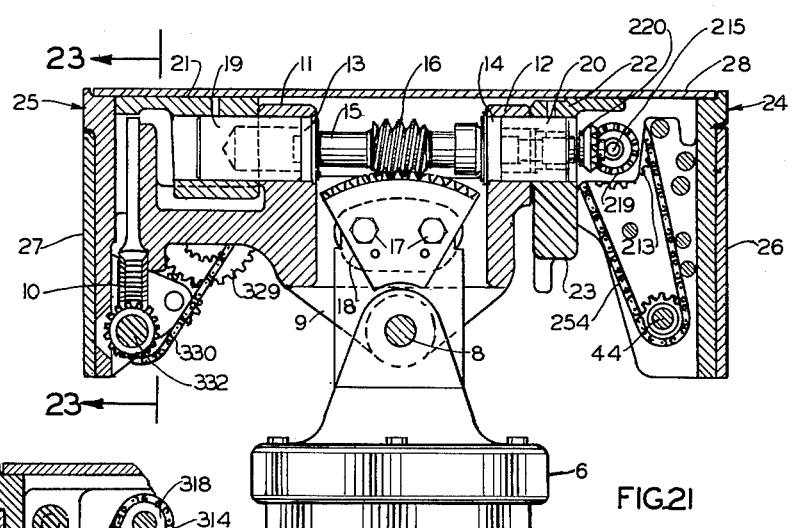
Figure 22:
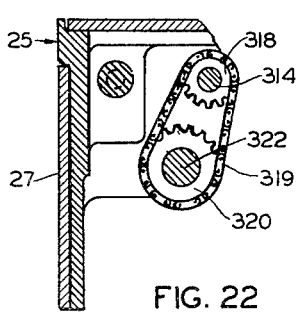
Figures 28, 29, 33:
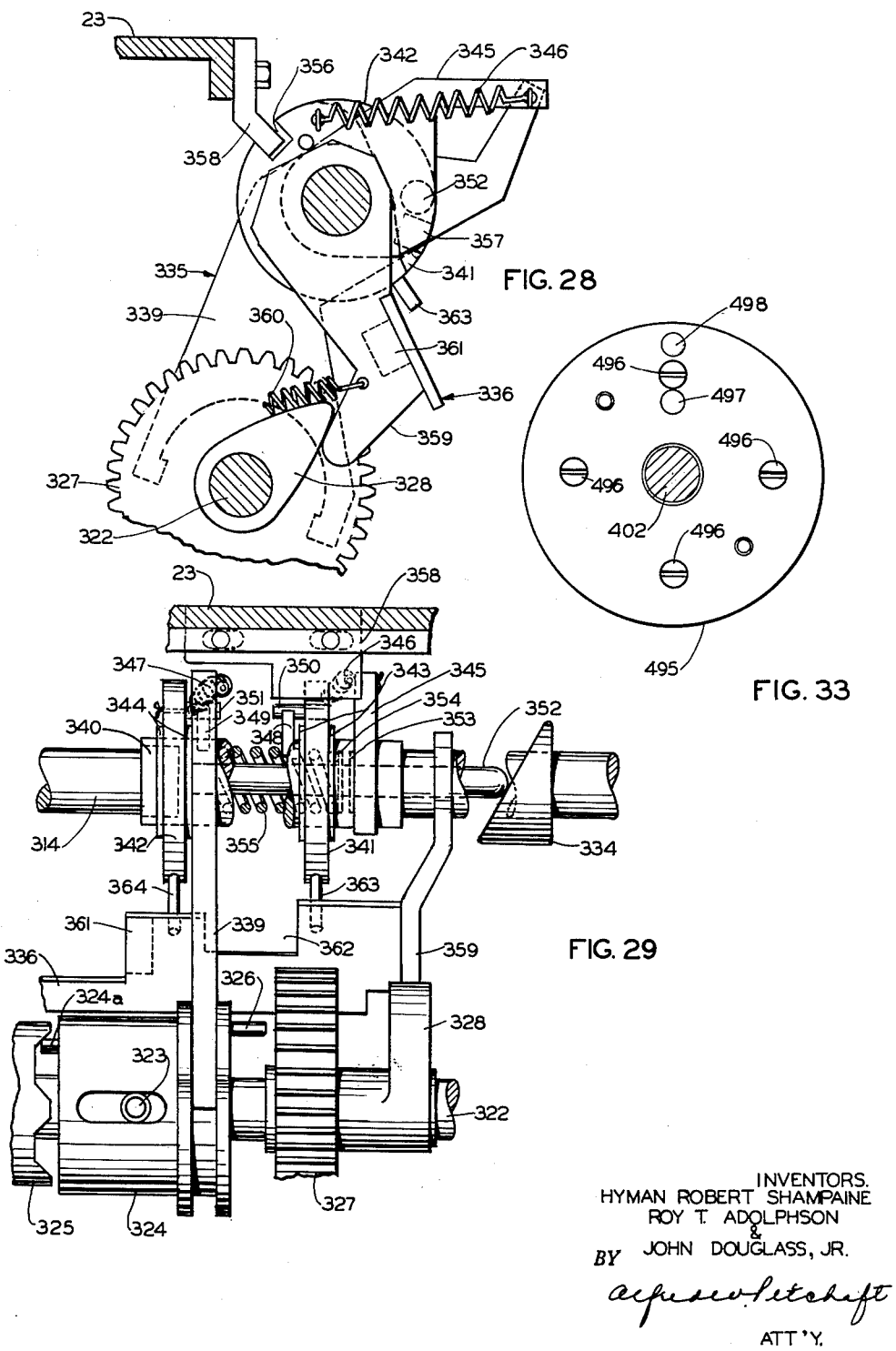

FIGS. 4, 5, 6, and 7, are fragmentary sectional views taken along lines 4—4, 5—5, 6—6, and 7—7, respectively, of FIG. 3;

FIG. 8 is a fragmentary sectional view taken along line 8—8 of FIG. 6;

FIG. 9 is a fragmentary sectional view taken along line 9—9 of FIG. 2;

FIG. 10 is a fragmentary sectional view taken along line 10—10 of FIG. 9;

FIG. 11 is a fragmentary sectional view taken along line 11—11 of FIG. 2;

FIG. 12 is a fragmentary sectional view taken along line 12—12 of FIG. 2;

FIG. 13 is a fragmentary side elevational view, partly broken away and in section, of the right side of the seat-section;

FIGS. 14, 15, 16, 17, 18, and 19 are fragmentary sectional views taken along lines 14—14, 15—15, 16—16, 17—17, 18—18, and 19—19 respectively, of FIG. 13;

FIG. 20 is a fragmentary sectional view taken along line 20—20 of FIG. 1;

FIGS. 21 and 22 are fragmentary sectional views taken along lines 21—21, 22—22 of FIG. 20;

FIG. 23 is a fragmentary sectional view taken along line 23—23 of FIG. 21;

FIGS. 24, 25, 26 and 27 are fragmentary sectional views taken along lines 24—24, 25—25, 26—26, 27—27, respectively, of FIG. 12;

FIG. 28 is a fragmentary sectional view taken along line 28—28 of FIG. 20;

FIG. 29 is a fragmentary side elevational view of the mechanism shown in FIG. 28;

FIG. 30 is a fragmentary longitudinal sectional view of a modified form of right arm assembly;

FIG. 31 is a fragmentary sectional view taken along line 31—31 of FIG. 30;

FIG. 32 is a fragmentary sectional view taken along line 32—32 of FIG. 30;

FIG. 33 is a fragmentary sectional view taken along line 33—33 of FIG. 31;

FIG. 34 is a sectional view taken along line 34—34 of FIG. 30;

FIG. 35 is a fragmentary side elevational view of the push-button assembly forming part of the present invention;

FIG. 36 is a side elevational view of the operating table showing the back-section elevated;

FIG. 37 is a side elevational view of the operating table in the reverse Trendelenberg position;

FIG. 38 is a side elevational view of the operating table in the Trendelenberg position;

FIG. 39 is a side elevational view of the operating table in the flex position and showing the body elevator raised;

FIG. 40 is a side elevational view of the operating table in the proctoscopic position;

FIG. 41 is a side elevational view of the operating table in the reflex position;

FIG. 42 is a side elevational view of the operating table in the neuro-surgical position;

FIG. 43 is a side elevational view of the operating table and showing the leg-section lowered; and FIG. 44 is a front elevational view of the operating table showing the lateral tilt position.

Broadly speaking, the operating table of the present invention comprises an articulated top consisting of a back-section, a seat-section, a leg-section and a so-called "kidney elevator" intermediate the back and seat-sections. The seat-section is supported on a large casting operatively mounted on the upper end of a supporting base, and also pivoted to the casting and located below the back-section are right and left control arms. The right control arm is provided with a crank and a push-button controlled selector mechanism whereby the basic table-top positions can be obtained through a mechanical drive system. Thus, by operation of the right arm crank in conjunction with the push-button selector mechanism it is possible to control;

(a) movement of the back-section
(b) movement of the leg-section
(c) movement of the kidney elevator
(d) lateral tilting
(e) movement to flex and reflex positions, and
(f) movement to and from the proctoscopic position.

Combinations of these basic movements permit the table to be placed in any position required for surgery. The left control arm is used to shift the table to Trendelenberg positions and the table may be moved to Trendelenberg or reverse Trendelenberg position independently of the relative positions of the top-sections.

Referring now in more detail and by reference characters to the drawings which illustrate a practical embodiment of the present invention, A designates an operating table comprising a base member 1 provided with depending casters 2 and its four corners with floor contacting jacks 3. Mounted on and extending upwardly from the base member 1 somewhat centrally thereof is a pedestal 4 which slidably supports a vertically shiftable hydraulic piston 5, the upper end of which has a cap casting or saddle 6 bolted thereto. The jacks 3 and hydraulic piston 5 are movable responsive to actuation of a foot pedal 7 which is operatively connected interiorly of the base member 1 to a suitable hydraulic mechanism of the type commonly utilized with such structures. Since the present invention does not relate to the hydraulic mechanism, the structure is not shown or described in detail.

Mounted in the cap casting 6 is a shaft 8 for rockably supporting a laterally tiltable yoke 9 having a gear segment 10 bolted or otherwise rigidly secured thereto. Formed on the yoke 9 are transversely aligned bearing supports 11, 12, for receiving bearings 13, 14, the latter journaling a worm shaft 15 integrally provided with a worm 16, and mounted on the cap casting 6 by means of bolts 17 and projecting upwardly therefrom is a gear segment 18, which meshes with the worm 16. Also mounted in the bearing supports 11, 12, and extending outwardly therefrom are sleeves 19, 20, which slidably fit into trunnions 21, 22, integrally formed on a seat casting 23. Secured to the seat casting 23 is a right side plate 24 and a left side plate 25, and disposed over the side plates 24, 25, are cover plates 26, 27. Also mounted on the seat casting 23 is a horizontal top cover or seat panel 28.

Mounted in the seat casting 23 and projecting laterally outwardly therefrom is a pin 29 which projects through a bearing 30 mounted in one end of the right arm casting 31 which extends in downwardly spaced relation to the back-section 32 as seen in FIG. 2. Formed in the arm casting 31 are end walls 33, 34, and intermediate walls 35, 36, provided with aligned bearings 37, 38, 39, 40, which journal a drum shaft 41 and a clutch shaft 42, the latter being provided on its forward end with a universal joint 43 for operative connection to a main drive shaft 44. Shiftably mounted on the drum shaft 41 is a selector drum 45 integrally provided on one end with a collar 46 having a pair of diametrally opposed axially extending pins 47, 48, which are adapted to slidably project into holes 49, 50, formed in a gear 51. The gear 51 is rotatably mounted on the drum shaft 41 and is restrained against axial movement therealong by means of a retaining ring 52 and a thrust washer 53. Integrally formed on the other end of the selector drum 45 is a collar 54 provided with diametrally opposed axial holes 55, 56 for slidably receiving a spring biased pin 57, the latter projecting axially outwardly from a drum clutch 58 rigidly mounted on the drum shaft 41. Encircling the drum shaft 41 is a retainer spring 59, the opposite ends of which bear against the collar 54 and the drum clutch 58. Intermediate the collars 46, 54, the selector drum 45 is integrally provided with spaced annular flanges 60, 61, and the flanges 60, 61 and the collar 54 are each provided with slot 63, 64, 65, the slots 63, 64, 65, being axially offset from each other a predetermined number of degrees and for purposes presently more fully appearing.

Rigidly mounted on the clutch shaft 42 adjacent the wall 35 is a clutch 66 provided with a spring biased pin 67 which projects axially outwardly thereof and projects into any one of a plurality of holes 68 formed in an engagement collar 69, the latter being mounted on the drum shaft 41 for axial sliding movement thereon by means of key 70. The engagement collar 69 and end collar 46 are each provided with an annular groove 71, 72, for receiving the upturned ends of an engagement link 73 whereby the selector drum 45 and engagement collar 69 are axially shiftable in unison along the drum shaft 41. Projecting inwardly from the side walls 74, 75, of the arm casting 31 are tapped bosses 76, 77, 78, 79, which receive screws 80, 81, 82, 83, for mounting support plates 84, 85, and the mounting screws 80, 81 also secure a guide plate 86 against the bosses 76, 77. Slidable along the plates 84, 85, 86, is a longitudinally shiftable catch plate 87 having a spring 88 connected to one end thereof, the other end of the spring 88 being secured to an eye bolt 89 mounted in the wall 35. Integrally formed on the catch plate 87 are three U-shaped bars 90, 91, 92, including arms 93, 94, 95, 96, 97, 98, which are disposed on either side of the selector drum 45 and terminate in downwardly spaced relation to the center line thereof.

Rigidly mounted in the side walls 74, 75, and projecting inwardly therefrom are six pins 99, 100, 101, 102, 103, 104, for rockably supporting six push-buttons 105, 106, 107, 108, 109, 110, and disposed encirclingly around the pins 99, 100, 101, 102, 103, 104, are springs 111, 112, 113, 114, 115, 116, which are secured at one end in the side walls 74, 75, and at their other ends bear against the push-buttons 105, 106, 107, 108, 109, 110, so as to bias the push-buttons in a counterclockwise direction as viewed from FIG. 3. Also formed on the push-buttons 105, 106, 107, 108, 109, 110, and projecting laterally inwardly therefrom are actuator pins 117, 118, 119, 120, 121, 122, which are approximately the same size as the slots 63, 64, 65, and are adapted to bear against the flanges 60, 61, and collar 54, and each of the push-buttons 105, 106, 107, 108, 109, 110, is further provided with a catch shoulder 123, 124, 125, 126, 127, 128, which is adapted for releasable latch-forming engagement with the arms 93, 94, 95, 96, 97, 98, all for purposes presently more fully appearing. Preferably, the push-buttons 105, 106, 107, 108, 109, 110 project upwardly through a top cover plate 129 which is secured to the arm casting 31 somewhat centrally thereof.

Rigidly mounted in the wall 36 is a bearing 130 for rotatably supporting a flexible shaft 131 which extends in downwardly spaced parallel relation to the drum shaft 41 and is provided on one end with a selector pinion 132 which is rigidly secured to the shaft 131 by means of a diametrally extending pin 133. As best seen by reference to FIGS. 5 and 6, the selector pinion 132 meshes with the selector gear 51. Also rigidly mounted in the walls 34, 35 is a sleeve 134 through which the flexible shaft 131 projects. Rigidly mounted on the drum shaft 41 adjacent the end wall 33 is a bevel gear 135 which meshes with a bevel gear 136 mounted on a handle shaft 137, the latter being journaled in an offset portion 138 of the end wall 33 by means of a bearing 139, and mounted on the end of the handle shaft 137 is a crank handle 140.

Figure 24:
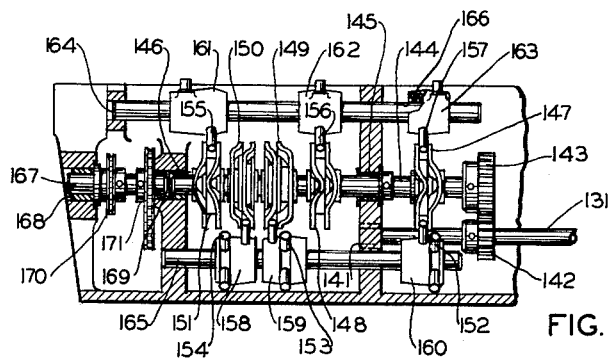
Figure 25:
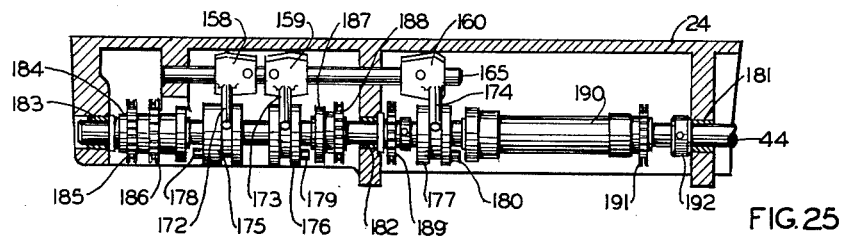
Figure 26:
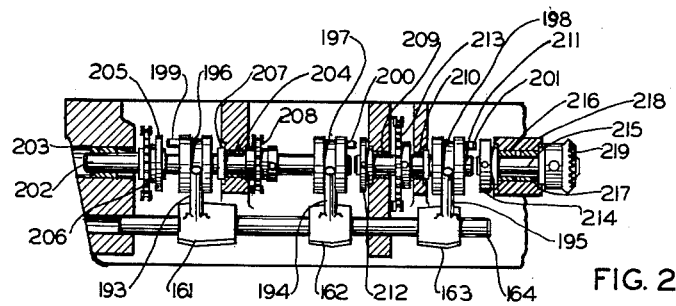
Figure 27:
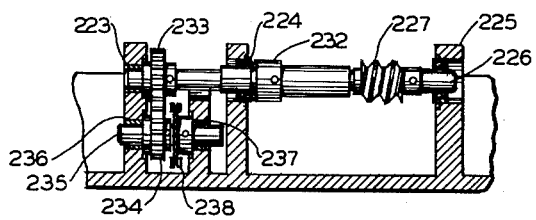

Referring now to FIGS. 24–25 it will be seen that the flexible shaft 131 projects outwardly of the arm casting 31 and is journaled at its end in the right side plate 24 by means of a bearing 141. Rigidly mounted on the flexible shaft 131 is a pinion 142 which meshes with a gear 143 rigidly mounted on a cam shaft 144, the latter also being rotatably mounted in the right side plate 24 by means of bearings 145, 146. Rigidly mounted on the cam shaft 144 are five cams 147, 148, 149, 150, 151, which are adapted to receive follower pins 152, 153, 154, 155, 156, 157, mounted on and projecting outwardly from six clutch actuators 158, 159, 160, 161, 162, 163. The clutch actuators 158, 159, 160, 161, 162, 163, are slidably mounted on spaced parallel shafts 164, 165, which are rigidly secured in the right side plate 24 in spaced parallel relation to the cam shaft 144. Preferably, the clutch actuators 158, 159, 160, 161, 162, 163, each include ball bushings 166, so as to be freely slidable on the shafts 164, 165, with a relatively small amount of friction. Coaxial with the cam shaft 144 is a stub shaft 167 which is journaled in bearings 168, 169, and is, furthermore, provided with sprockets 170, 171, rigidly mounted thereon. The clutch actuators 158, 159, 160, are, furthermore, provided with arms 172, 173, 174, for slidable engagement with clutches 175, 176, 177, each having a clutch pin 178, 179, 180, and the clutches 175, 176, 177, are keyed or otherwise mounted for axial shifting movement on the main drive shaft 44.

As seen by reference to FIG. 25 the main drive shaft 44 is also journaled in the right side plate 24 by means of bearings 181, 182, 183, and rotatably mounted on the main drive shaft 44 adjacent the clutch 175 is a quill 184 which is releasably engageable with the clutch pin 178. Mounted on the quill 184 is a pair of sprockets 185, 186. Also rotatably mounted on the main drive shaft 44 adjacent the clutch 176 is a quill 187 which is releasably engageable with the clutch pin 179, and formed on the quill 187 is a sprocket 188. Also fixed to the main drive shaft 44 adjacent the bearing 182 is a sprocket 189, and rotatably mounted on the shaft 44 adjacent the clutch 177 is a quill 190 which is releasably engageable with the clutch pin 180. Rigidly mounted on the end of the quill 190 is a sprocket 191, and adjacent the bearing 181 the main drive shaft 44 is provided with a set collar 192.

The clutch actuators 161, 162, 163 are provided with arms 193, 194, 195 for slidable engagement with clutches 196, 197, 198, the latter also including clutch pins 199, 200, 201. As best seen by reference to FIG. 26 the clutches 196, 197 are keyed or otherwise mounted for axial shifting movement along a shaft 202 which is journaled in the right side plate 24 by means of bearings 203, 204. Rotatably mounted on the shaft 202 is a quill 205 which is releasably engageable by the clutch pin 199, and formed on the quill 205 is a sprocket 206. Also rigidly mounted on the shaft 202 adjacent to and on either side of the bearing 204 is a set collar 207 and a sprocket 208. Rotatably mounted in the right side plate 24 by means of bearings 209, 210 is a shaft 211 which is coaxial with the shaft 202 and is provided on one end with a collar 212 which is releasably engageable with the clutch pin 200. Also rigidly mounted on the shaft 211 is a sprocket 213 and shiftably mounted on the other end of the shaft 211 is the clutch 198, the pin 201 of which is releasably engageable with a disc 214, the latter being rigidly mounted on one end of a shaft 215. The shaft 215 is coaxial with the shaft 211 and is rotatably mounted in aligned bearings 216, 217, which are fixed in a boss 218 integrally formed on the seat casting 23, and rigidly secured on the end of the shaft 215 is a bevel gear 219. The bevel gear 219 meshes with a similar bevel gear 220 which is mounted on the end of the worm shaft 15.

Rotatably mounted in the right side plate 24 in upwardly and outwardly spaced parallel relation to the shaft 202 by means of aligned bearings 223, 224, 225 is a shaft 226 provided adjacent one end with a worm 227 which meshes with a worm wheel 228 rigidly mounted on a cross shaft 229, the latter being rotatably supported in bearings 230, 231. Mounted on the shaft 226 adjacent the bearing 224 is a set collar 232 and also rigidly mounted on the shaft 226 adjacent the bearing 223 is a gear 233 which meshes with a gear 234 mounted on a stub shaft 235, the latter being in downwardly and outwardly spaced parallel relation to the shaft 226 and rotatably supported in the right side plate 24 by means of bearings 236, 237. Also mounted on the stub shaft 235 is a sprocket 238. Also rotatably mounted in the right side plate 24 in laterally outwardly spaced parallel relation to the shaft 202 by means of bearings 239, 240 is a shaft 241 provided with spaced sprockets 242, 243, and, furthermore, rotatably mounted in the right side plate 24 by means of bearings 244, 245 is a shaft 246 having a sprocket 247 and a worm 248 rigidly mounted thereon, the latter being adapted to mesh with a worm wheel 249 which is rigidly mounted on the end of a transversely extending kidney elevator drive shaft 250.

Referring now to FIGS. 14–19 it will be seen that a roller chain 251 is trained around the sprockets 185, 206 so as to provide a drive connection between the shafts 44, 202, and, similarly, trained around the sprockets 188, 238 is a roller chain 252, thereby providing a driving connection between the shafts 44, 235. The sprocket 186 on the main drive shaft 44 is in alignment with the sprocket 171 on the shaft 167 and trained around the sprockets 171, 186 is a roller chain 253. Similarly trained around the sprocket 189 on the shaft 44 is a roller chain 254 which is also operatively trained around the sprocket 213 on the shaft 211. Likewise trained around the sprocket 191 on the main drive shaft 44 is a roller chain 255 which is, in turn, trained around the sprocket 247 on the shaft 246, and operatively trained around the sprocket 170 on the shaft 167 is a roller chain 256 which is also trained around the sprocket 243 on the shaft 241.

As seen by reference to FIGS. 11, 13, and 20, the kidney elevator shaft 250 is rotatable in spaced aligned bearings 257, 258 which are mounted in the seat casting 23, and rockably mounted on the shaft 250 are spaced rack guides 259, 260, each of which is integrally provided with sleeves 261, 262. Shiftably mounted in the sleeves 261, 262 are spaced parallel rack bars 263, 264, which project upwardly through oval shaped clearance holes 265, 266, formed in the upper surface of the seat casting 23, and at their upper ends the racks 263, 264 are rigidly cross-connected by means of a body or kidney elevator plate 267 which extends intermediate the seat plate 28 and back-section 32. Rigidly mounted on the shaft 250 are spaced pinions 267a, 267b, which mesh, respectively, with the rack bars 263, 264.

Integrally formed on and depending from the rack guide 259 is an arm 268 which is provided with an elongated slot 269 for slidably receiving a pin 270 mounted on and projecting laterally outwardly from a link 271. The link 271 is provided with spaced parallel offset slots 272, 273, the slot 273 being adapted to receive a sleeve 274 which is mounted on the shaft 229 adjacent the worm wheel 228. Also rigidly mounted on the shaft 229 is a pinion 275 which meshes with a back-section gear 276 rotatably mounted on a fixed shaft 277 located in downwardly and forwardly spaced parallel relation to the shaft 229. The shaft 277 projects through the slot 272 and is provided adjacent the link 271 with a retaining ring 278. Formed in the gear 276 is a cam slot 279 having a straight portion 280 and a circular portion 281 which is concentric with the shaft 277. Mounted on the link 271 intermediate the slots 272, 273 is a roller 282 which rides in the cam slot 279, and at the end opposite the slot 273 the link 271 is provided with an elongated slot 283 for slidably receiving an actuator pin 284 which is mounted in the arm casting 31 in downwardly spaced parallel relation to the pivot pin 29.

Bolted or otherwise rigidly secured to the gear 276 is a back-section arm 285 which projects outwardly from the seat casting 23 and is provided on its outer end with a roller 286. The roller 286 rides in a trackway 287 which is mounted on the underside of the back-section 32 as seen in FIG. 2. The back-section 32 is, furthermore, rockably secured to the seat casting 23 by means of pins 288, 289. If desired, a manually adjustable head rest 290 may be mounted on the end of the back-section 32.

Trained around the sprocket 242 is a roller chain 291 which extends across the seat casting 23 and is also trained around a sprocket 292 which is mounted on a worm shaft 293. The worm shaft 293 is rotatably mounted in bearings 294, 295, which are fixed in the seat casting 23 and mounted on the shaft 293 adjacent the bearing 294 is an adjusting collar 296. Rigidly mounted on the worm shaft 293 intermediate the sprocket 292 and collar 296 is a worm 297 which meshes with a worm wheel segment 298 mounted on a cross shaft 299, the latter being rotatable in the left side plate 25. Keyed or otherwise rigidly mounted in the shaft 299 and movable with the worm wheel segment 298 is a leg-section control arm 300 which is pivotally secured at its outer end to one end of a leg-section link 301 by means of a pin 302. The link 301, in turn, extends upwardly and is pivotally secured to the underside of a leg-section 303 by means of a pin 304. The leg-section 303 is, furthermore, rockably mounted on pins 305, 306, which are, in turn, secured to crutch socket brackets 307, 308, the latter being bolted or otherwise rigidly secured to the seat casting 23 and side plates 24, 25.

As will be seen by reference to FIGS. 1 and 2 the crutch socket brackets 307, 308, if desired, may be suitably provided with removable crutch sockets 309, 310, and, furthermore, the back-section 32, seat-section 28, and leg-section 303 may also be provided at the lateral margins thereof with side rails 311 for mounting various types of attachments ordinarily found on major operating tables.

Operatively trained around the sprocket 298 is a roller chain 312 which extends transversely across the seat casting 23 and is also trained around a sprocket 313 which is mounted on a longitudinally extending shaft 314 journaled in the left-hand side of the seat casting 23 by means of bearings 315, 316, 317. Similarly mounted on the shaft 314 adjacent the bearing 315 is a sprocket 318 around which is trained a roller chain 319, the latter, in turn, also being trained around a sprocket 320 mounted on a sleeve 321. The sleeve 321 is rotatably mounted on the shaft 322 which is journaled in the seat casting 23 in downwardly spaced parallel relation to the shaft 314. Secured to the shaft 322 by means of a pin 323 and being axially shiftable therealong is a double acting clutch 324 which is engageable with a clutch jaw 325 rigidly provided on the sleeve 321 by a pin 324a. The clutch 324 is also provided with a pin 326 which is engageable with a gear 327 rotatably mounted on the shaft 322, and integrally formed on the hub of the gear 327 is a somewhat pointed cam 328 for purposes presently more fully appearing. Also rigidly mounted on the shaft 322 adjacent the cam 328 is a sprocket 329 around which is trained a roller chain 330, the roller chain 330 being, in turn, trained around a sprocket 331. As best seen by reference to FIGS. 20 and 21 the sprocket 331 is rigidly mounted on the end of a Trendelenberg worm shaft 332 which is rotatably mounted in the left side plate 25 and is provided with a worm 333 which meshes with the gear segment 10.

Referring now to FIGS. 20, 28, 29, it will be seen that the shaft 314 is rigidly provided adjacent the bearing 317 with a cam 334, and also operatively mounted on the shaft 314 is a shift yoke assembly 335 and a release plate 336, the shift yoke assembly 335 and release plate 336 being normally urged in the direction of the cam 334 by means of compression springs 337, 338, and extending outwardly from the shift yoke assembly 335 is a shift fork 339 which operates the clutch 324. This shift yoke assembly 335 comprises a sleeve 340 which encircles the shaft 314 and the shift fork 339 is welded, or otherwise rigidly secured, to the sleeve 340. Rotatably mounted on the sleeve 340 are spaced parallel discs 341, 342, which are restrained against axial movement along the sleeve 340 by means of retaining rings 343, 344. Also rigidly mounted on the sleeve 340 in spaced relation to the disc 341 is an arm 345, and connected at their opposite ends to the arms 339, 345, and discs 341, 342, are spaced tension springs 346, 347. Mounted in and projecting radially outwardly from the sleeve 340 are spaced parallel stop pins 348, 349, which are adapted to abut stop pins 350, 351, mounted in and projecting outwardly from the discs 341, 342. Shiftably mounted in the arms 339, 345, in spaced parallel relation to the sleeve 340 is a plunger 352, the forward end of which rides on the cam 334. Mounted on the plunger 352 adjacent the arm 345 is a retaining ring 353, and also mounted on the plunger 352 adjacent the retaining ring 353 is an abutment ring 354 which receives one end of a compression spring 355, the latter being disposed around the plunger 352 and abutting at its opposite end against the shift arm 339.

Formed in the discs 341, 342 are slots 356, 357, the slot 356 being adapted to receive the end of a catch plate 358 rigidly secured to the seat casting 23. The release plate 336 is integrally provided with a follower arm 359 and a spring 360 which is also secured to the seat casting 23, and thereby biases the follower arm 359 into engagement with the cam 328 so that rotation of the cam 328 will cause the release plate 336 to rock on the shaft 314. Also formed on the release plate 336 is a flange 361 and a relief slot 362. The release plate 336 is adapted to engage radially outwardly projecting pins 363, 364 on the discs 341, 342 so as to rotate the latter for purposes presently more fully appearing.

Rotatably secured to the seat casting 23 adjacent the left side thereof by means of a pin 365 is a left arm casting 366 which is provided with spaced parallel ribs 367, 368 which support spaced aligned bearings 369, 370 for rotatably supporting a drive shaft 371. The drive shaft 371 is restrained against axial movement by means of set collars 372, 373 and provided on one end of the shaft 371 is a universal joint 374 which couples the shaft 371 with a Trendelenberg drive shaft 375. As best seen by reference to FIG. 20 the Trendelenberg drive shaft 375 is journaled in the left side plate 25 and is provided on its end with a pinion 376 which meshes with the gear 327. Rotatably mounted in the left arm casting 366 by means of bearings 377, 378, is a crank handle shaft 379 which is provided on its outer end with a crank handle 380 and is coupled at its inner end to the shaft 371 by means of a universal joint 381. Also rotatably mounted on a fixed shaft 382 within the left arm casting 366 is a tilt-indicator drum 383 having a graduated dial face 384 which can be observed through a window 385, the latter being retained by an escutcheon plate 386. Wrapped a plurality of turns around the drum 383 is a flexible cable 387 which is slidable in a cable casing 388, the casing 388 being securely held within the arm 366 by means of a set screw 389. Secured to the end of the cable 387 within the arm casting 366 is a spring 391 which is also secured to the rib 367 by means of a bolt 392. As seen by reference to FIG. 20, the cable extends outwardly of the arm casting 366 and is trained around a shoulder 393 on the lateral tilt yoke 9. The shoulder 393 is in the shape of a circular arc concentric with the axis of Trendelenberg rotation. The cable 387 comes off toward the arm 366 tangent to the arcuate shoulder 393, and the end of the cable 387 projects into a hole in the lateral tilt yoke 9 and is rigidly secured therein by means of a set screw 394.

The arm castings 31, 366 are rigidly connected intermediate their ends by means of a large cross brace 395 so that the arm castings 31, 366, and mechanism therein are movable in unison.

The operation and various positions of the operating table will now be described:

Kidney Elevator

The push-button 107 is depressed causing the pin 119 to shift the selector drum 45 toward the end wall 33 in opposition to the force exerted by the compression spring 59 so that the pin 57 on the clutch 58 engages the collar 54 on the selector drum 45. Since the selector drum 45 is operatively connected to the engagement collar 69 by the engagement link 73, movement of the selector drum 45 will also cause the engagement collar 69 to shift out of engagement with the pin 67 on the clutch 66. Furthermore, as the push-button 107 is depressed, it will bear against the arm 96 on the U-shaped bar 91 to urge the catch plate 87 toward the wall 33 in opposition to the force of the spring 88 until the catch shoulder 125 rides up on and latches with the upper end of the arm 96. The crank handle 140 may then be rotated so as to drive the shaft 41, the selector drum 45, and gear 51, which, in turn, drives the selector pinion 132, thus rotating the flexible shaft 131. Rotation of the flexible shaft 131 will drive the cam shaft 144 through the meshing gears 142, 143 until the selector drum 45 has rotated to the position wherein the pin 119 is in alignment with the slot 64, whereupon the selector drum 45 will be pushed backwardly by the spring 59. The collar 54 on the selector drum 45 will then be disengaged with the pin 57 on the clutch 58 and the engagement collar 69 can then interlock with the pin 67 on the clutch 66. Continued rotation of the crank handle 140 will, therefore, not drive the flexible shaft 131 and cam shaft 144. During the interval in which the cam shaft 144 was rotating the cam 147 shifted the clutch actuator 160 causing the clutch 177 to engage the sleeve 190. As the crank handle 140 is rotated the shaft 41 will rotate and drive the shaft 42 which, in turn, rotates the main drive shaft 44 to drive the sprocket 191. The roller chain 255 will drive the sprocket 247 so as to rotate the shaft 246 and worm 248. The worm 248 drives the gear 249 thus rotating the body elevator drive shaft 250 and the pinions 267a, 267b, drive the racks 263, 264 which, in turn, move the body elevator 267 upwardly and downwardly.

*Back-Section*

In order to elevate or lower the back-section 32, the push-button 109 is depressed urging the selector drum 45 into engagement with the clutch 58 and at the same time the push-button 109 will bear against the arm 93 on the U-shaped bar 92 and push the catch plate forwardly until the catch shoulder 127 latchingly engages with the upper end of the arm 98. At the same time movement of the catch plate 87 will release the body elevator button 107 allowing it to swing upwardly to its inoperative position. The crank handle 140 is then rotated so as to drive the flexible shaft 131 and cam shaft 144 until the pin 121 is in alignment with the slot 65 on the selector drum 45 whereupon the selector drum 45 will shift backwardly so as to operatively clutch the shaft 41 with the main drive shaft 44 in the manner previously described. During rotation of the cam shaft 144 the clutch 177 will disengage the sleeve 190 thereby cutting out the drive to the body elevator, while at the same time the clutch actuator 159 will be shifted by the cam 149 so that the clutch 176 will drive the sprocket 188. This sprocket 188 will drive the sprocket 238 through the roller chain 252 so as to drive the gears 233, 234, and worm 227 which, in turn, drives the worm wheel 228. Rotation of the worm wheel 228 will drive the shaft 229 so as to drive the gears 275, 276 and thereby operate the back-section arm 285 and shift back-section 32.

During elevation of the back-section arm 285 the roller 282 rides in the circular portion 281 of the cam slot 279 and, furthermore, the roller 282 will ride in the circular portion 281 during a portion of the downward travel of the back-section arm 285. However, as the back-section 32 is progressively lowered the arm castings 31, 366 would interfere with further downward travel of the back-section 32, but as the back-section 32 approaches the arms 31, 366 the roller 282 will ride in the cord portion 280 of the cam slot 279. Consequently, further rotation of the gear 276 will cause the link 271 to shift linearly and pull the arms 31, 366 downwardly with the back-section 32. Moreover, movement of the link 271 will also shift the pin 270 which is mounted thereon, and the pin 270 will move along the slot 269 and rock the kidney elevator 267. As a result, if the kidney elevator 267 is thereafter extended it will move outwardly along a path which substantially bisects the angle between the seat and back-sections.

*Leg-Section*

To operate the leg-section the push-button 108 is depressed releasing the push-button 109 so as to clutch in the crank handle 140 with the flexible shaft 131 through the selector drum 45 in the manner previously described. As the cam shaft 144 rotates the cam 150 will operate the clutch actuator 158 which will, in turn, cause the clutch 175 to engage the sprocket 186. The selector drum 45 will then shift back to the disengaged position upon rotation of the crank handle 140 and further rotation of the crank handle 140 will drive the main drive shaft 44 so as to rotate the sprocket 186. As the sprocket 186 rotates it will drive the sprocket 171 through the roller chain 253 which will, in turn, drive the sprockets 170, 243, through roller chain 256. Through shaft 241, the sprocket 242 drives the sprocket 292 through roller chain 291 and thereby rotates the leg-section worm shaft 293 and its associated worm 297. The worm 297 drives the worm wheel segment 298 and shaft 299 which, through the control arm 300 and link 301, lower the leg-section 303.

*Lateral Tilt*

To operate the lateral tilt drive, the push-button 110 is depressed releasing the previously depressed push-button and allowing the crank handle 140 to drive the flexible shaft 131 and cam shaft 144. The cam 147 will move the clutch actuator 163 so as to shift the clutch 198 into driving engagement with the disc 214. As the selector drum 45 shifts backwardly out of driving engagement with the clutch 58 rotation of the crank handle 140 will drive the sprockets 189, 213 through the roller chain 254 which will, in turn, drive the shaft 211 and bevel gear 219. The bevel gear 219 drives the bevel gear 220 which rotates the worm shaft 15 and causes the worm 16 to crawl along the gear segment 18. As the worm 16 crawls along the gear segment 18 the lateral tilt yoke 9 will rock about the shaft 8 so as to tilt the table laterally in either direction.

*Flex*

To shift the operating table to the flex or reflex position the push-button 106 is depressed releasing the previously depressed push-button and, at the same time, shift the selector drum 45 into engagement with the clutch 58, allowing the crank handle 140 to drive the flexible shaft 131 and cam shaft 144 in the manner previously described. The cam 149 shifts the actuator 159 which urges the clutch 176 into driving engagement with the sprocket 188 so that the back-section 32 can be driven in the manner previously described when the selector drum 45 is shifted out of engagement with the clutch 58. At the same time the rotation of the cam shaft 144 will cause the cam 148 to shift the clutch actuator 162 which, in turn, urges the clutch 197 into driving engagement with the collar 212. The sprocket 208 drives the sprocket 313 through the roller chain 312 causing the shaft 314 to rotate. Assuming, for the moment, that the clutch 324 is engaged with the gear 327 it will be seen that rotation of the shaft 314 will also cause the cam 334 to rotate and push against the plunger 352. The plunger 352 will bear against the disc 342 with the result that continued rotation of the shaft 314 will cause the cam 334 to shift the entire shift yoke assembly 335 along the shaft 314 until the disc 341 is clear of the catch plate 358, whereupon the spring 346 will rotate the disc 341 until the pins 348, 350, abut each other. The disc 341 will then abut the catch plate 358 so as to hold the shift yoke assembly 335 in the locked position. As the shift yoke assembly 335 moves in the manner just described, the arm 339 will move the clutch 324 into engagement with the clutch jaw 325 through pin 324a. Consequently, as the shaft 314 rotates the sprocket 318 will drive the roller chain 319 so as to drive the sprocket 320 and sleeve 321. Since the clutch 324 is in engagement with the clutch jaw 325 the shaft 322 and sprocket 329 will also be driven, and the sprocket 329 will drive the sprocket 331 through the roller chain 330 and thereby rotate the Trendelenberg worm 333. The Trendelenberg worm 333 crawls along the gear segment 10 causing the table to rock about the sleeves 19, 20. As the crank handle 140 is turned in one direction the seat-section 28 will go into reverse Trendelenberg, while the back-section will, simultaneously therewith, drop downwardly to place the table in the flex position.

Furthermore, as previously pointed out, as the back-section 32 drops downwardly to a predetermined point, the link 271 causes the arm castings 31, 366 to drop downwardly and avoid interference of the back-section 32 with the arm castings 31, 366. Similarly, the body elevator 267 will be rocked by the link 271 so that if thereafter extended, the body elevator 267 will substantially bisect the angle between the seat-section 28 and back-section 32. By reason of the fact that the arm castings 31, 366 drop downwardly, a greater amount of travel of the back-section 32 is permitted and, therefore, the operating table of the present invention is capable of assuming a complementary flex angle which is significantly greater than has heretofore been obtainable. It will be apparent that by rotation of the crank handle 140 in the opposite direction the seat-section 28 will be placed in Trendelenberg while the back-section 32 will be elevated so that the operating table can assume the reflex position.

Proctoscopic

In order to place the operating table in the proctoscopic position the push-button 105 is depressed releasing the previously depressed push-button so as to drivingly connect the selector drum 45 with the clutch 58 in the manner previously described. As the crank handle 140 rotates the flexible shaft 131 and cam shaft 144 will rotate allowing the cam 151 to move the clutch actuator 161 so as to cause the clutch 196 to drivingly engage the sprocket 206 while at the same time the cam 150 will shift the clutch actuator 158 to cause the clutch 175 to drive the sprockets 185, 186. As the selector drum 45 releases, rotation of the crank handle 140 will rotate the main drive shaft 44, driving the sprockets 185, 186, to drive the sprocket 206 through the roller chain 251. The shaft 202 will then be driven which, in turn, will drive the sprocket 208 to transmit power through the roller chain 312 to the sprocket 313 and shaft 314 and thereby drive the shaft and the Trendelenberg worm 333 and place the table in Trendelenberg. At the same time, rotation of the crank handle 140 will transmit power through the sprockets 186, 171, 170, 243, 242, 292, through the roller chains 253, 256, 291, and leg-section worm 297. The worm 297 will drive the worm wheel 298 and lower the leg-section 303.

In conection with the six drive assemblies previously described it will be apparent that the cams 147, 148, 149, 150, 151, are mounted on the cam shaft 144 in precisely predetermined relationship to each other and also in relationship to the slots 63, 64, 65, on the selector drum 45. Since the slots 63, 64, 65, are axially offset from each other a predetermined number of degrees, and since there are six actuator pins 117, 118, 119, 120, 121, 122, one on each of the push-buttons 105, 106, 107, 108, 109, 110, the selector drum 45 will spring back out of driving engagement from the clutch 58 only at six different angular positions. The predetermined position will, of course, be determined by whichever one of the push-buttons 105, 106, 107, 108, 109, 110, is depressed. Consequently, the cams 147, 148, 149, 150, 151, will cease rotating in any one of the predetermined six positions so as to shift the several clutch actuators 158, 159, 160, 161, 162, 163, and engage the several clutches 175, 176, 177, 196, 197, 198, in accordance with the particular push-button 105, 106, 107, 108, 109, 110, which has been depressed. Therefore, the proper drive system will always be operated each time one of the push-buttons 105, 106, 107, 108, 109, 110 is depressed. It will also be apparent that one of the push-buttons 105, 106, 107, 108, 109, 110, will always remain in the depressed or operating position.

Trendelenberg

Assuming that the operating table had been previously placed in either the flex or proctoscopic position, the clutch 324 will be engaged with the clutch jaw 325 and the shift yoke assembly 335 will be in the locked position against the catch plate 358. The crank handle 380 on the left arm casting 366 is then rotated to drive the Trendelenberg drive shaft 375 and gear 376 which will, in turn, drive the gear 327. As the gear 327 rotates the cam 328 will urge the release plate 336 into engagement with the pins 363, 364, and rotate the discs 341, 342, so that the slot 356 is in alignment with the catch plate 358 and the slot 357 is in alignment with the pin 352. The compression spring 337 will move the shift yoke assembly 335 along the shaft 314 and shift the clutch 324 into driving engagement with the gear 327. The gear 327 will then be rotatable with the shaft 322 with the result that continued rotation of the Trendelenberg drive shaft 375 will rotate the shaft 322 and sprocket 329 to drive the sprocket 331 through the roller chain 330. As the sprocket 331 is driven the Trendelenberg worm 333 will rotate and crawl along the gear segment 10 and thereby move the table into Trendelenberg and reverse Trendelenberg positions, depending upon the direction of rotation of the crank handle 380. As a result, the operating table can at all times be readily placed in Trendelenberg by merely rotating the crank handle 380.

As the table moves to Trendelenberg and reverse Trendelenberg position, the cable 387 will rotate the drum 383 and register the angle of tilt of the operating table. Since the cable 387 comes off tangent to the arcuate shoulder 393 of lateral tilt yoke 9 the number of degrees of rotation of the seat-section 28 will be correspondingly translated to the drum 383 so that a true angle of tilt can always be observed through the window 385. Moreover, it will be apparent that the cable 387 will rotate the drum 383 only when the seat-section 28 is in Trendelenberg or reverse Trendelenberg and will not register any change of angle when the arm castings 31, 366 move with the back-section 32.

If the operating table has previously been shifted to or from Trendelenberg by means of the crank handle 380, and it is thereafter desired to move the table to the flex or proctoscopic position, the appropriate push-button is depressed so as to operate the selected drive assembly through the crank handle 140 in the manner previously described. The shift yoke assembly 335 will then be shifted along the shaft 314 until it locks behind the catch plate 358 causing the clutch 324 to engage the clutch jaw 325. However, it frequently happens that the previous time the operating table was in the flex or proctoscopic position the plunger 352 will be disposed in the slot 357. However, as the shaft 314 begins to rotate and the low point of the cam 334 is reached, the plunger 352 will move forwardly past the disc 342 and allow the spring 347 to rotate the disc 342 and move the slot 357 out of the path of the plunger 352. As the shaft 314 and cam 334 continue to rotate and move back toward the high side of the cam 334, the plunger 352 will abut the disc 342 and permit the shift yoke assembly 335 to move back into locked position behind the catch plate 358. It also sometimes happens that the Trendelenberg drive through the left arm crank handles 380 will be stopped so that the high point of the cam 328 is biasing the release plate 336 in its released position. Consequently, placing the table in flex or proctoscopic position might not be possible since the release plate 336 would prevent movement of the shift yoke assembly 335. However, under these conditions the pin 364 on the disc 342 will contact the flange 361 on the release plate 336 as the cam 334 pushes the plunger 352 and shift yoke assembly 335 along the shaft 314.

Consequently, the pin 364 will move the release plate 336 against the force of the compression spring 338 until the release plate 336 is clear of the cam 328, at which time it will swing out of the path of movement of the shift yoke assembly 335 and allow the shift yoke assembly 335 to move into locked position behind the catch plate 358.

It is also possible to provide a modified form of right or control arm 400 as shown in FIGS. 30–35. Journaled in the arm 400 at one end by means of a bearing 401 is a selector shaft 402, the other end of which is journaled in a bearing 403 mounted in a push-button housing 404, the latter being mounted in an opening 405 in the arm 400. Shiftably mounted on the shaft 402 is a selector sleeve 406 which includes a pair of spaced ball bushings 407, 408, and rigidly mounted on the shaft 402 intermediate the ball bushings 407, 408, is a spring collar 409. Encircling the shaft 402 intermediate the spring collar 409 and ball bushing 407 is a compression spring 410. Mounted on one end of the selector sleeve 406 is a clutch 411 provided with opposed slots 412, 413, for receiving a pin 414 which extends diametrically through the selector shaft 402. Rotatably mounted on the pin 414 are spaced rollers 415, 416, which ride in the slots 412, 413. Also mounted in the clutch 411 in spaced parallel relation to the shaft 402 is a clutch pin 417 which is normally biased outwardly by means of a spring 418, and the clutch pin 417 is adapted to engage in any one of a plurality of holes 419 formed in a collar 420. The collar 420 is rotatable on the shaft 402 and is provided with a gear 421. Rigidly mounted on the shaft 402 adjacent the gear 421 is a gear 422 which meshes with a selector pinion 423 mounted on the end of a flexible shaft 131', the flexible shaft 131' being rotatable in a bearing 424. The flexible shaft 131' extends through the arm 400 and into the seat casting 23 for operative connection to the cam shaft 144 in the same manner as the flexible shaft 131 previously described.

Also rotatably mounted in the arm casting 400 by means of bearings 425, 426, is a shaft 427 provided on one end with a universal joint 428 connected to one end of a main drive shaft 44' which extends into the seat casting 23 in the same manner as, and for the same purpose as, the main drive shaft 44, previously described. Rotatably mounted on the shaft 427 is a sleeve 429 which is rigidly provided with a gear 430, and the sleeve 429 is also provided with a hole 431 for receiving a pin 432 rigidly mounted in and projecting outwardly from a clutch 433. The clutch 433 is keyed to the shaft 427 for slidable movement therealong, and encircling the shaft 427 is a compression spring 434 which biases the clutch 433 to the left, reference being made to FIG. 30.

Shiftably mounted in the arm casting 400 by means of bearings 435, 436, and being in spaced parallel relation to the shafts 402, 427, is a shift rod 437 which is rigidly provided with a pair of spaced shift forks 438, 439, for shifting the clutch 433, and for purposes presently more fully appearing. Also rotatably mounted in the arm casting 400 by means of bearings 440, 441, is a shaft 442 which is disposed in spaced parallel relation to the shafts 402, 427, and rigidly mounted on the shaft 422 is a pinion 443 which meshes with the gear 421 and a second pinion 444 which meshes with the gear 430. At the end opposite the gear 444 the shaft 442 is provided with a universal joint 445 which couples the shaft 442 to an offset handle shaft 446, the outer end of which is provided with a crank handle 447.

Threaded into the push-button housing 404 are bolts 449, 450, 451, provided with sleeves 452, 453, 454, which bear against the housing 404. Mounted on the bolts 449, 450, 451, is a catch plate 455 which is held in outwardly spaced parallel relation to the housing 404 by means of the spacer sleeves 452, 453, 454. As seen by reference to FIG. 34 the bolts 449, 450, 451, project through elongated slots 456, 457, 458, which are formed in the catch plate 455, and secured at one end to the sleeves 453, 454, are tension springs 459, 460, the other ends of which are secured to spring studs 461, 462, mounted on the catch plate 455. The catch plate 455 is, furthermore, provided with an elongated central slot 463 which loosely receives the selector shaft 402. Formed in the push-button housing 404 are six sockets 464, 465, 466, 467, 468, 469, for slidably receiving six push-buttons 470, 471, 472, 473, 474, 475, and disposed around the push-buttons 470, 471, 472, 473, 474, 475, are compression springs 476, 477, 478, 479, 480, 481, which are also positioned in the sockets 464, 465, 466, 467, 468, 469, and abut the end walls thereof. Mounted in and projecting radially outwardly from each push-button 470, 471, 472, 473, 474, 475, is a pin 482 which rides between a pair of spaced parallel pins 483, 484, so as to prevent the push-buttons from rotating within the housing 404. It will be apparent from FIG. 34 that there are six pairs of pins 483, 484, one for each of the push-buttons. Each of the push-buttons is, furthermore, provided with a collar 485 and a conical cam shoulder 486 which define a groove 487, and the ends of each of the push-buttons project through holes 488, 489, 490, 491, 492, 493, which are formed in the catch plate 455.

The selector sleeve 406 is formed with an end flange 494 upon which a selector plate 495 is rigidly secured by means of a plurality of screws 496. As seen by reference to FIG. 33 the selector plate 495 is, furthermore, provided with a pair of spaced holes 497, 498, which are adapted to receive the ends of the push-buttons 470, 471, 472, 473, 474, 475, as will presently more fully appear.

In use and operation, if it is desired to drive the back-section 32 the push-button 470 is depressed causing the collar 485 to cam the catch plate 455 laterally until the push-button 470 has been depressed far enough to allow the catch plate 455 to snap into the notch 487 thereon under the action of the springs 459, 460. When the push-button 470 is in its fully depressed position its end will bear again the selector plate 495 and thereby urge the selector sleeve 406 along the shaft 402 in opposition to the force of the compression spring 410. This movement of the selector sleeve 406 will shift the clutch 411 into engagement with the sleeve 420 and at the same time cause the shift rod 437 to move and shift the clutch 433 along the shaft 427 in opposition to the force of the compression spring 434. As the clutch 433 is thus shifted it will move out of driving engagement with the sleeve 429 so that upon rotation of the crank handle 447 the pinion 443 will drive the gear 421 which will, in turn, rotate the selector sleeve 406 and gear 422. The gear 422 will drive the selector pinion 423 to rotate the flexible shaft 131'. The pinion 444 will also drive the gear 430 but since the clutch 433 has been shifted to its disengaged position, rotation of the crank handle 447 will merely cause the gear 430 to rotate freely on the shaft 427 and no power will be transmitted to the drive shaft 44'. When the selector sleeve 406 and selector plate 495 have rotated to the point where the hole 498 is in alignment with the end of the push-button 470, the spring 410 will shift the selector sleeve 406 to its released position allowing the selector plate 495 to slide over the end of the push-button 470, such that it projects through the hole 498. As the selector sleeve 406 moves to released position it will carry with it the clutch 411 and shift forks 438, 439, so as to release the clutch 411 from engagement with the sleeve 420 and at the same time allow the spring 434 to urge the clutch 433 into engagement with the sleeve 429. Rotation of the crank handle 447 will then transmit power through the pinion 444 and gear 430 which will, in turn, drive the shaft 427 and main drive shaft 44' to elevate or lower the back-section of the operating table. The pinion 443 will also rotate the gear 421 but since the latter is not clutched with the shaft 402 the gear 421 will merely rotate freely thereon.

When it is desired to place the operating table in the flex or reflex position the push-button 471 is depressed pushing the selector plate 495 and selector sleeve 406 forwardly in the manner just described, and as the push-button is depressed to its fullest extent the catch plate 455 will ride up on a conical cam portion 486 and hold the catch plate 455 out of engagement with the notch 487 on the push-button 470. The push-button spring 479 will then urge the push-button 470 back to its non-operating position. The crank handle 447 is then rotated to drive the flexible shaft 131 until the hole 497 in the selector plate 495 is in alignment with the push-button 471 whereupon the selector sleeve 406 will shift to its released position and permit the crank handle 447 to drive the operating table into the flex position. The lateral tilt push-button 472, the leg-selection push-button 473, the proctoscopic push-button 474, and the body elevator push-button 475 may be operated in the same manner. Furthermore, it will be apparent that one of the several push-buttons will always remain in the depressed or operative position.

It will also be apparent that the selector plate 495 allows six different angular positions of the selector sleeve 406 since the inner hole 497 can interlock with the push-buttons 471, 474, while the outer hole will interlock with the push-buttons 470, 472, 473, 475. Since the cams 147, 148, 149, 150, 151, are precisely related with respect to the angular position of the selector drum 406, the cams 147, 148, 149, 150, 151, will always be properly oriented to permit operation of the drive as predetermined by the particular push-button depressed.

It should be understood that changes and modifications in the form, construction, arrangement, and combination of the several parts of the operating table may be made and substituted for those herein shown and described without departing from the nature and principle of our invention.

Having thus described our invention, what we claim and desire to secure by Letters Patent is:

1. An operating table comprising a base, an articulated top portion operatively mounted on said base and including a center-section, said top portion also including an additional section swingably mounted adjacent each end of the center-section, driving means for laterally tilting said top portion, driving means for independently swinging each of said additional sections longitudinally, driving means for simultaneously longitudinally tilting the center-section in one direction and swinging one of said additional sections in the other direction, driving means for simultaneously longitudinally tilting the center-section in one direction and swinging the other of said additional sections in the other direction, a body elevator operatively mounted intermediate the center-section and one of said additional sections, driving means for moving said body elevator outwardly of the top portion, a main shaft for operating each of said driving means, means including a single manually operable crank for driving said main shaft, selector shaft means operatively interposed between said crank and main shaft, push-button controlled means for drivingly connecting said crank to said selector shaft means and at substantially the same time disconnect the drive from the crank to the main shaft whereby rotation of the crank will pre-select one of said drives for operation therewith, said push-button controlled means also being adapted to disconnect the drive from to said selector shaft means, and at substantially the same time drivingly connect said crank to said main shaft, thereby permitting said crank to operate the pre-selected drive.

2. An operating table comprising a base, an articulated top portion operatively mounted on said base and including a seat-section, said top portion also including a leg-section swingably mounted adjacent one end of the seat-section and a back-section swingably mounted adjacent the other end of the seat-section, a pair of arms rockably secured to the seat-section and extending outwardly therefrom in downwardly spaced relation to said back-section, driving means for laterally tilting said top portion, driving means for independently swinging the leg and back-sections, driving means for simultaneously longitudinally tilting the seat-section in one direction and swinging the back-section in the other direction, driving means for simultaneously longitudinally tilting the seat-section in one direction and swinging the leg-section in the other direction, a body elevator operatively mounted between the seat and back-sections, driving means for moving said body elevator outwardly of said top portion, means including a single crank on one of said arms for actuating each of said driving means, and means including a single crank on the other of said arms for longitudinally tilting said top portion into Trendelenberg and reverse Trendelenberg positions.

3. An operating table comprising a base, an articulated top portion operatively mounted on said base and including a seat-section, said top portion also including a leg-section swingably mounted adjacent one end of the seat-section and a back-section swingably mounted adjacent the other end of the seat-section, a pair of arms rockably secured to the seat-section and extending outwardly therefrom in downwardly spaced relation to said back-section, driving means for laterally tilting said top portion, driving means for independently swinging the leg and back-sections, driving means for simultaneously longitudinally tilting the seat-section in one direction and swinging the back-section in the other direction, driving means for simultaneously longitudinally tilting the seat-section in one direction and swinging the leg-section in the other direction, a body elevator operatively mounted between the seat and back-sections, driving means for moving said body elevator outwardly of said top portion, means including a single crank on one of said arms for actuating each of said driving means, selector means operable through said single crank for pre-selecting any one of said driving means for operation by said crank, said selector means including a plurality of push-buttons each being operatively related to one of said driving means, said push-buttons being mounted on said last mentioned arm, and means including a single crank on the other of said arms for longitudinally tilting said top portion into Trendelenberg and reverse Trendelenberg positions.

4. An operating table comprising a base, an articulated top portion operatively mounted on said base and including a seat-section, said top portion also including a back-section swingably mounted adjacent one end of the seat-section, a pair of arms swingably mounted adjacent said one end of said seat-section and extending in downwardly spaced relation to said back-section, driving means for lowering said back-section, said driving means being operable by a single crank mounted on one of said arms, link means operatively connected to the driving means and to said arms, and cam-operated means operatively connecting said link means and driving means for allowing said arms to remain immobile as the back-section is lowered to a predetermined point at which point the cam-operated means causes the link means to move the arms downwardly in unison with the back-section.

5. An operating table comprising a base, an articulated top portion operatively mounted on said base and including a seat-section, said top portion also including a back-section swingably mounted adjacent one end of the seat-section, a body elevator operatively mounted intermediate said seat-section and back-section, driving means for moving said body elevator outwardly of said seat and back-sections, driving means for lowering said back-section, rocking means for rocking said body elevator as the back-section is driven so that when extended, the body elevator will substantially bisect the angle between the back and seat-sections when the back-section is lowered below a predetermined point, said rocking means being operatively connected to said last-named driving means, said rocking means including a body elevator shaft rotatably mounted in said seat-section, a pair of rack guides rockably mounted on said shaft and spaced upwardly therefrom, and a pair of rack bars shiftably mounted in said rack guides, said rack guides being operatively connected to said body elevator.

6. An operating table comprising a base, an articulated top portion operatively mounted on said base and including a seat-section, said top portion also including a back-section swingably mounted adjacent one end of the seat-section, a body elevator operatively mounted intermediate said seat-section and back-section, driving means for moving said body elevator outwardly of said seat and back-sections, said driving means including a body elevator shaft rotatably mounted in said seat-section, a pair of rack guides rockably mounted on said shaft and spaced upwardly therefrom, a pair of rack bars shiftably mounted in said rack guides, said rack guides being operatively connected to said body elevator, driving means for lowering said back-section, and cam-operated link means operatively connecting said last mentioned driving means with the body elevator for rocking said body elevator about a transverse axis as the back-section is lowered below a predetermined point.

7. An operating table comprising a base, an articulated top portion operatively mounted on said base and including a center-section, said top portion also including an additional section swingably mounted adjacent each end of the center-section, first driving means for simultaneously longitudinally tilting the center-section in one direction and swinging one of said additional sections in another direction, second driving means for tilting the entire top portion longitudinally, and means for automatically engaging the first driving means and cutting out the second driving means when the first driving means is operated, said last named means adapted to engage the second driving means and cut out the first driving means when the second driving means is operated.

8. An operating table comprising a base, an articulated top portion operatively mounted on said base and including a center-section, said top portion also including an additional section swingably mounted adjacent each end of the center-section, first driving means for simultaneously longitudinally tilting the center-section in one direction and swinging one of said additional sections in another direction, second driving means for tilting the entire top portion longitudinally, a crank for actuating each of said driving means, and automatically shiftable clutch means for engaging the first selected driving means upon rotation of the crank associated therewith and at the same time cutting out the second said driving means, said clutch means being adapted to engage the second of said driving means and disconnect the first of said driving means when said second driving means is operated.

9. An operating table comprising a base provided with a circular shoulder, an articulated top portion operatively mounted on said base and including a center-section, an arm pivotally secured to said center-section, a tilt indicator drum rotatably mounted on said arm, and a cable trained around said drum and resiliently secured at one end to the arm, said cable being trained around said circular shoulder and secured at its other end in said base so as to extend outwardly tangent to said circular shoulder, whereby rotation of the center-section will pull the cable and rotate the drum.

10. An operating table comprising a base, an articulated top portion operatively mounted on said base and including a center-section, said top portion also including an additional section swingably mounted adjacent each end of the center-section, driving means for laterally tilting said top portion, driving means for independently swinging each of said additional sections longitudinally, driving means for simultaneously longitudinally tilting the center-section in one direction and swinging one of said additional sections in the other direction, driving means for simultaneously longitudinally tilting the center-section in one direction and swinging the other of said additional sections in the other direction, a body elevator operatively mounted intermediate the center-section and one of said additional sections, driving means for moving said body elevator outwardly of the top portion, a main drive shaft for operating each of said driving means, means including a manually operable crank for driving said main shaft, selector shaft means, a plurality of cams operatively driven by said selector shaft means, a plurality of clutches operable by said cams, selector means including a plurality of push-buttons for operatively connecting said crank to said selector shaft whereby rotation of said selector shaft will operate said clutches to engage the driving means selected by one of the push-buttons, said selector means also being adapted to disconnect the drive from said crank to said selector shaft means when the cams have operated said clutches to engage the driving means, thereby permitting said crank to operate the pre-selected drive.

11. A surgical operating table comprising an upstanding base, a seat-forming section swivelly mounted upon the upper end of said base, a leg-section swingably mounted on and projecting outwardly from the forward end of the seat-forming section, a back-section swingably mounted on and extending outwardly from the rear end of the seat-section, driving means operatively mounted upon the seat-section for tilting the seat-section with respect to the base and for swinging the leg-section and back-section into various selected positions with respect to the seat-forming section, control arm means swingably mounted on the seat-section and extending rearwardly therefrom in downwardly spaced relation to the back-section, manually operable means carried by the control arm means and being operably connected to the driving means, and means actuably responsive to movement of the driving means for swinging the control arm means downwardly as the back-section swings downwardly.

12. An operating table comprising a base provided with a circular shoulder, an articulated top portion operatively mounted on said base and including a seat-section, said top portion also including a back-section swingably mounted adjacent one end of the seat-section, a pair of arms swingably mounted adjacent said one end of said seat-section and extending in downwardly spaced relation to said back-section, driving means for lowering said back-section, said driving means being operable by a single crank mounted on one of said arms, link means operatively connected to the driving means and to said arms, cam-operated means operatively connecting said link means and driving means for allowing said arms to remain immobile as the back-section is lowered to a predetermined point at which point the cam-operated means causes the link means to move the arms downwardly in unison with the back-section, a tilt indicator drum rotatably mounted on one of said arms, and a cable trained around said drum and resiliently secured at one end to said arms, said cable also being trained around the circular shoulder and secured at its other end in the base so as to extend outwardly tangent to the circular shoulder, whereby rotation of the seat-section will pull the cable and rotate the drum.

13. An operating table comprising a base provided with a circular shoulder, an articulated top portion operatively mounted on said base and including a center-section, said top portion also including an additional section swingably mounted adjacent each end of the center-section, an arm pivotally secured to said center-section, driving means for simultaneously longitudinally tilting the center-section in one direction and swinging one of said additional sections in another direction, driving means for tilting the entire top portion longitudinally, a crank for actuating each of said driving means, automatically shiftable clutch means for engaging the selected driving means upon rotation of the crank associated therewith and at the same time cutting out the other of said driving means, a tilt indicator drum rotatably mounted on said arm, and a cable trained around said drum and resiliently secured at one end to the arm, said cable also being trained around the circular shoulder and secured at its other end in the base so as to extend outwardly tangent to said circular shoulder, whereby rotation of the center-section will pull the cable and rotate the drum.

14. An operating table comprising a base, an articulated top portion operatively mounted on said base and including a center-section, said top portion also including an additional section swingably mounted adjacent each end of the center-section, driving means for laterally tilting said top portion, driving means for independently swinging each of said additional sections longitudinally, driving means for simultaneously longitudinally tilting the center-section in one direction and swinging one of said additional sections in the other direction, driving means for simultaneously longitudinally tilting the center-section in one direction and swinging the other of said additional sections in the other direction, a body elevator operatively mounted intermediate the center-section and one of said additional sections, driving means for moving said body elevator outwardly of the top portion, a main drive shaft for operating each of said driving means, means for driving said main shaft, selector shaft means, a plurality of cams operatively driven by said selector shaft means, a plurality of clutches operable by said cams, and selector means for operatively connecting the means for driving said main shaft to said selector shaft whereby rotation of said selector shaft will operate said clutches to engage the driving means selected by said selector means, said selector means also being adapted to disconnect the means for driving said main shaft from the selector shaft means when the cams have operated said clutches to engage the driving means, thereby permitting the means for driving the main shaft to operate the pre-selected drive.

15. An operating table comprising a base, an articulated top portion operatively mounted on said base and including a center-section, said top portion also including an additional section swingably mounted adjacent each end of the center-section, driving means for laterally tilting said top portion, driving means for independently swinging each of said additional sections longitudinally, driving means for simultaneously longitudinally tilting the center-section in one direction and swinging one of said additional sections in the other direction, driving means for simultaneously longitudinally tilting the center-section in one direction and swinging the the other of said additional sections in the other direction, a body elevator operatively mounted intermediate the center-section and one of said additional sections, driving means for moving said body elevator outwardly of the top portion, a main drive shaft for operating each of said driving means, means for driving said main shaft, selector shaft means, a plurality of cams operatively driven by said selector shaft means, a plurality of clutches operable by said cams, and selector means including a plurality of push-buttons for operatively connecting the means for driving said main shaft to said selector shaft whereby rotation of said selector shaft will operate said clutches to engage the driving means selected by one of the push-buttons, said selector means also being adapted to disconnect the drive from the means for driving said main shaft to said selector shaft means when the cams have operated said clutches to engage the driving means, thereby permitting the means for driving said main shaft to operate the pre-selected drive.

16. An operating table comprising a base, an articulated top portion operatively mounted on said base and including a seat-section, said top portion also including a kidney elevator section mounted for vertical shifting movement adjacent one end of the seat-section, a back-section swingably mounted adjacent one end of the kidney elevator section, a pair of arms swingably mounted adjacent said one end of said seat-section and extending in downwardly spaced relation to said back-section, driving means for lowering said back-section through a predetermined path while at the same time allowing said arms to remain immobile, said driving means also being operable to lower said arms and back-section in unison when said back-section has swung downwardly past a predetermined point, and link means operatively connected to said back-section for causing said kidney elevator section to move outwardly along a path which substantially bisects the angle between the seat and back sections when the back-section is lowered.

17. An operating table comprising a base, a seat-section rockably mounted on the base, a back-section swingably mounted on the seat-section, a leg-section swingably mounted on the seat-section, driving means operatively mounted in the seat-section for tilting said seat-section in relation to the base, separate driving means for independently swinging the back and leg sections relatively to the seat-section, transmission means in the seat-section, clutch means for simultaneously connecting the seat-section driving means and the back-section driving means to the transmission means, clutch means for simultaneously connecting the seat-section driving means and the leg-section driving means to the power transmission means, a housing swingably mounted on the seat-section in downwardly spaced relation to the back-section and extending beneath said back-section, power means operatively mounted in the housing, flexible connector means drivingly connecting the power means to the transmission means so that power can be operatively transmitted from the power means to the transmission means irrespective of relative movement between the housing and the seat-section, means for swinging the housing downwardly in relation to the seat-section as the back-section swings downwardly so as to avoid interference between the housing and the back-section, said last named means including a back-section arm rigidly connected to said back-section, a roller mounted on the other end of said arm, a gear mounted in said seat-section and having a cam slot, said cam slot having a straight portion and a circular portion, said roller being adapted to ride in said circular portion during a part of the downward travel of said housing and adapted to ride in the straight portion during a further part of the downward travel, a body elevator operatively mounted intermediate the center section and one of said additional sections, driving means for moving said body elevator outwardly of the top portion, and means including a single manually operable element for actuating each of said driving means.

18. An operating table comprising a base, an articulated top portion operatively mounted on said base and including a center-section, said top portion also including an additional section swingably mounted adjacent each end of the center-section, first driving means for simultaneously longitudinally tilting the center section in one direction and swinging one of said additional sections in another direction, second driving means for tilting the entire top portion longitudinally, a crank for actuating each of said driving means, a main shaft for operating each of said driving means, a crank for driving said main shaft, a selector shaft, a cam shaft having a plurality of cams mounted thereon, each of said cams being driven by said selector shaft, a plurality of clutches operable by said cams, means for operatively connecting said crank to said selector shaft whereby rotation of the selector shaft will operate the clutches to engage the driving means, and automatically shiftable clutch means for engaging the first selected driving means upon rotation of the crank associated therewith and at the same time disconnecting the second said driving means, said clutch means being adapted to engage the second of said driving means and disconnect the first of said driving means when the second driving means is operated.

19. An operating table comprising a base, an articulated top portion operatively mounted on said base and including a center-section, said top portion also including an additional section swingably mounted adjacent each end of the center-section, driving means for laterally tilting said top portion, driving means for independently swinging each of said additional sections longitudinally, driving means for simultaneously longitudinally tilting the center-section in one direction and swinging one of said additional sections in the other direction, driving means for simultaneously longitudinally tilting the center-section in one direction and swinging the other of said additional sections in the other direction, a body elevator operatively mounted intermediate the center-section and one of said additional sections, driving means for moving said body elevator outwardly of the top portion, a main drive shaft for operating each of said driving means, a universal joint mounted on one end of said main shaft, a clutch shaft operatively connected to said universal joint, a drum shaft operatively connected to the other end of said clutch shaft, a manually operable crank operatively connected to the free end of said drum shaft, whereby rotation of said crank will rotate said drum shaft and drive said main drive shaft, selector shaft means, a plurality of cams operatively driven by said selector shaft means, a plurality of clutches operable by said cams, and selector means including a plurality of push-buttons for operatively connecting said crank to said selector shaft means whereby rotation of said selector shaft will operate said clutches to engage the driving means selected by one of the push-buttons, said selector means also being adapted to disconnect the drive from said crank to said selector shaft means when the cams have operated said clutches to engage the driving means, thereby permitting said crank to operate the pre-selected drive.

20. An operating table comprising a base, an articulated top portion operatively mounted on said base and including a center-section, said top portion also including an additional section swingably mounted adjacent each end of the center-section, driving means for laterally tilting said top portion, driving means for independently swinging each of said additional sections longitudinally, driving means for simultaneously longitudinally tilting the center-section in one direction and swinging one of said additional sections in the other direction, driving means for simultaneously longitudinally tilting the center-section in one direction and swinging the other of said additional sections in the other direction, a body elevator operatively mounted intermediate the center-section and one of said additional sections, driving means for moving said body elevator outwardly of the top portion, a main drive shaft for operating each of said driving means, a universal joint mounted on one end of said main shaft, a clutch shaft operatively connected to said universal joint, a drum shaft operatively connected to the other end of said clutch shaft, a manually operable crank operatively connected to the free end of said drum shaft, whereby rotation of said crank will rotate said drum shaft and drive said main drive shaft, selector shaft means, a plurality of cams operatively driven by said selector shaft means, a plurality of clutches operable by said cams, and selector means including a selector drum mounted on said drum shaft for axial shifting movement, said selector means also including a plurality of push-buttons for operatively connecting said crank to said selector shaft whereby rotation of said selector shaft means will operate said clutches to engage the driving means selected by one of the push-buttons, said selector means also being adapted to disconnect the drive from said crank to said selector shaft means when the cams have operated said clutches to engage the driving means, thereby permitting said crank to operate the pre-selected drive.

21. An operating table comprising a base, an articulated top portion operatively mounted on said base and including a center-section, said top portion also including an additional section swingably mounted adjacent each end of the center-section, driving means for laterally tilting said top portion, driving means for independently swinging each of said additional sections longitudinally, driving means for simultaneously longitudinally tilting the center-section in one direction and swinging one of said additional sections in the other direction, driving means for simultaneously longitudinally tilting the center-section in one direction and swinging the other of said additional sections in the other direction, a body elevator operatively mounted intermediate the center-section and one of said additional sections, driving means for moving said body elevator outwardly of the top portion, Trendelenberg driving means for tilting said table longitudinally into Trendelenberg and reverse Trendelenberg positions, and clutch means for disengaging said Trendelenberg driving means when operating the other of said driving means.

22. An operating table comprising a base, an articulated top portion operatively mounted on said base and including a seat-section, said top portion also including a leg-section swingably mounted adjacent one end of the seat-section and a back-section swingably mounted adjacent the other end of the seat-section, a pair of arms rockably secured to the seat-section and extending outwardly therefrom in downwardly spaced relation to said back-section, driving means for laterally tilting said top portion, driving means for independently swinging the leg and back-sections, driving means for simultaneously longitudinally tilting the seat-section in one direction and swinging the back-section in the other direction, driving means for simultaneously longitudinally tilting the seat-section in one direction and swinging the leg-section in the other direction, a body elevator operatively mounted between the seat and back sections, driving means for moving said body elevator outwardly of said top portion, means including a first single crank on one of said arms for actuating each of said driving means, means including a second single crank on the other of said arms for longitudinally tilting said top portion into Trendelenberg and reverse Trendelenberg positions, and clutch means operatively associated with said second single crank for disengaging each of said other driving means when said second single crank is being operated.

References Cited in the file of this patent

UNITED STATES PATENTS

| | | |
|---|---|---|
| 1,571,205 | Laurent | Feb. 2, 1926 |
| 1,814,482 | Miller | July 14, 1931 |
| 1,946,899 | Clachko | Feb. 13, 1934 |
| 2,092,266 | Talas | Sept. 7, 1937 |
| 2,172,941 | Manning et al. | Sept. 12, 1939 |
| 2,416,410 | Shampaine | Feb. 25, 1947 |
| 2,501,415 | Shampaine | Mar. 21, 1950 |
| 2,520,455 | Clachko | Aug. 29, 1950 |
| 2,647,026 | Shampaine | July 28, 1953 |
| 2,700,583 | Davis et al. | Jan. 25, 1955 |
| 2,794,694 | Fullwood et al. | June 4, 1957 |